(12) United States Patent
Luther et al.

(10) Patent No.: US 10,873,835 B2
(45) Date of Patent: Dec. 22, 2020

(54) OBJECT TRACKING USING A COGNITIVE HETEROGENEOUS AD HOC MESH NETWORK

(71) Applicant: Quixotic Holdings LLC, Tacoma, WA (US)

(72) Inventors: Ryan Scott Luther, Tacoma, WA (US); Matthew David Perdew, Anchorage, AK (US)

(73) Assignee: QUIXOTIC HOLDINGS LLC, Tacoma, WA (US)

( * ) Notice: Subject to any disclaimer, the term of this patent is extended or adjusted under 35 U.S.C. 154(b) by 0 days.

(21) Appl. No.: 16/805,547

(22) Filed: Feb. 28, 2020

(65) Prior Publication Data

US 2020/0204957 A1  Jun. 25, 2020

Related U.S. Application Data

(62) Division of application No. 16/203,279, filed on Nov. 28, 2018, now Pat. No. 10,609,517, which is a
(Continued)

(51) Int. Cl.
*H04W 24/00* (2009.01)
*H04W 4/029* (2018.01)
(Continued)

(52) U.S. Cl.
CPC ........ *H04W 4/029* (2018.02); *H04B 7/18504* (2013.01); *H04B 7/18506* (2013.01);
(Continued)

(58) Field of Classification Search
CPC ............ H04B 7/18504; H04B 7/18506; H04B 7/0617; H04B 7/086; H04B 7/26;
(Continued)

(56) References Cited

U.S. PATENT DOCUMENTS

| | | | | |
|---|---|---|---|---|
| 6,236,357 B1 * | 5/2001 | Corwith | ................ | G01S 5/0027 342/357.31 |
| 7,006,032 B2 * | 2/2006 | King | .................... | G08G 5/0008 342/29 |

(Continued)

OTHER PUBLICATIONS

Kotaru et al., "SpotFi: Decimeter Level Localization Using WiFi," *ACM SIGCOMM Computer Communication Review—SIGCOMM'15* 45(4):269-282, 2015.

*Primary Examiner* — Ronald Eisner
(74) *Attorney, Agent, or Firm* — Seed IP Law Group LLP

(57) ABSTRACT

Embodiments described herein are directed to a tracking objects using a cognitive heterogeneous ad hoc mesh network. Participant objects transmit notification signals to inform other participant objects in line-of-sight of their position and movement. The participants also utilize echoes of the notification signals to detect and estimate the position and movement of non-participant objects. Participant objects can then share this positional information with one another to refine the estimated position and movement of non-participant objects. The position of each other participant and non-participant object is updated based on an individualized update rate that dynamically changes based on the distance and velocity of closure between the participant and the other participant or non-participant object.

20 Claims, 25 Drawing Sheets

Related U.S. Application Data division of application No. 15/892,259, filed on Feb. 8, 2018, now Pat. No. 10,178,509.

(60) Provisional application No. 62/467,572, filed on Mar. 6, 2017.

(51) Int. Cl.
<table>
<tr><td>*H04B 7/185*</td><td>(2006.01)</td></tr>
<tr><td>*H04W 40/22*</td><td>(2009.01)</td></tr>
<tr><td>*H04W 4/06*</td><td>(2009.01)</td></tr>
<tr><td>*H04W 4/40*</td><td>(2018.01)</td></tr>
<tr><td>*H04W 4/02*</td><td>(2018.01)</td></tr>
<tr><td>*H04W 84/12*</td><td>(2009.01)</td></tr>
<tr><td>*H04W 84/18*</td><td>(2009.01)</td></tr>
</table>

(52) U.S. Cl.
CPC ........... *H04W 4/023* (2013.01); *H04W 4/027* (2013.01); *H04W 4/06* (2013.01); *H04W 4/40* (2018.02); *H04W 40/22* (2013.01); *H04W 84/12* (2013.01); *H04W 84/18* (2013.01)

(58) Field of Classification Search
CPC .... H04B 7/2606; H04W 40/22; H04W 4/023; H04W 4/027; H04W 4/029; H04W 4/06; H04W 4/40; H04W 84/12; H04W 84/18; A61K 31/4745; A61K 47/646; C07D 455/06; G01S 13/91; G08G 5/0008
See application file for complete search history.

(56) References Cited

U.S. PATENT DOCUMENTS

| | | |
|---|---|---|
| 2005/0125134 A1* | 6/2005 | Iwatsuki ............... B60T 8/1755 |
| | | 701/70 |
| 2006/0082502 A1 | 4/2006 | Dooley |
| 2012/0109421 A1 | 5/2012 | Scarola |
| 2016/0105766 A1 | 4/2016 | De La Broise |
| 2016/0198431 A1 | 7/2016 | Pattabiraman et al. |
| 2016/0258766 A1 | 9/2016 | Felemban et al. |

* cited by examiner

OBJECT TRACKING USING A COGNITIVE HETEROGENEOUS AD HOC MESH NETWORK

BACKGROUND

Technical Field

The present disclosure relates generally to information distribution networks and, more particularly, to utilizing mobile and stationary communication devices to create a multi-layered mesh network for safety and data transmission.

Description of the Related Art

Mobile communication devices have become a very integral part in many people's lives, and the number of mobile communication devices in use continues to grow. Today, mobile communication devices are very powerful computers that are connected via various different networks, data paths, and protocols. Yet most mobile communication devices rely on stationary cellular or wireless access points or satellite transmissions to connected to a particular network, which can limit access, increase latency, or decrease bandwidth based on the network layout, the number of users on a particular network, a user's location, and other factors. It is with respect to these and other considerations that the following disclosure addresses.

BRIEF SUMMARY

Briefly stated, embodiments described herein are directed to tracking objects using data communication from a cognitive heterogeneous ad hoc mesh network. Participant objects transmit notification signals to inform other participant objects in line-of-sight of their position and movement. The participants also utilize echoes of the notification signals to detect and estimate the position and movement of non-participant objects. Participant objects can then share this positional information with one another to refine the estimated position and movement of non-participant objects. The position of each other participant and non-participant object is updated based on an individualized update rate that dynamically changes based on the distance and velocity of closure between the participant and the other participant or non-participant object.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1A:
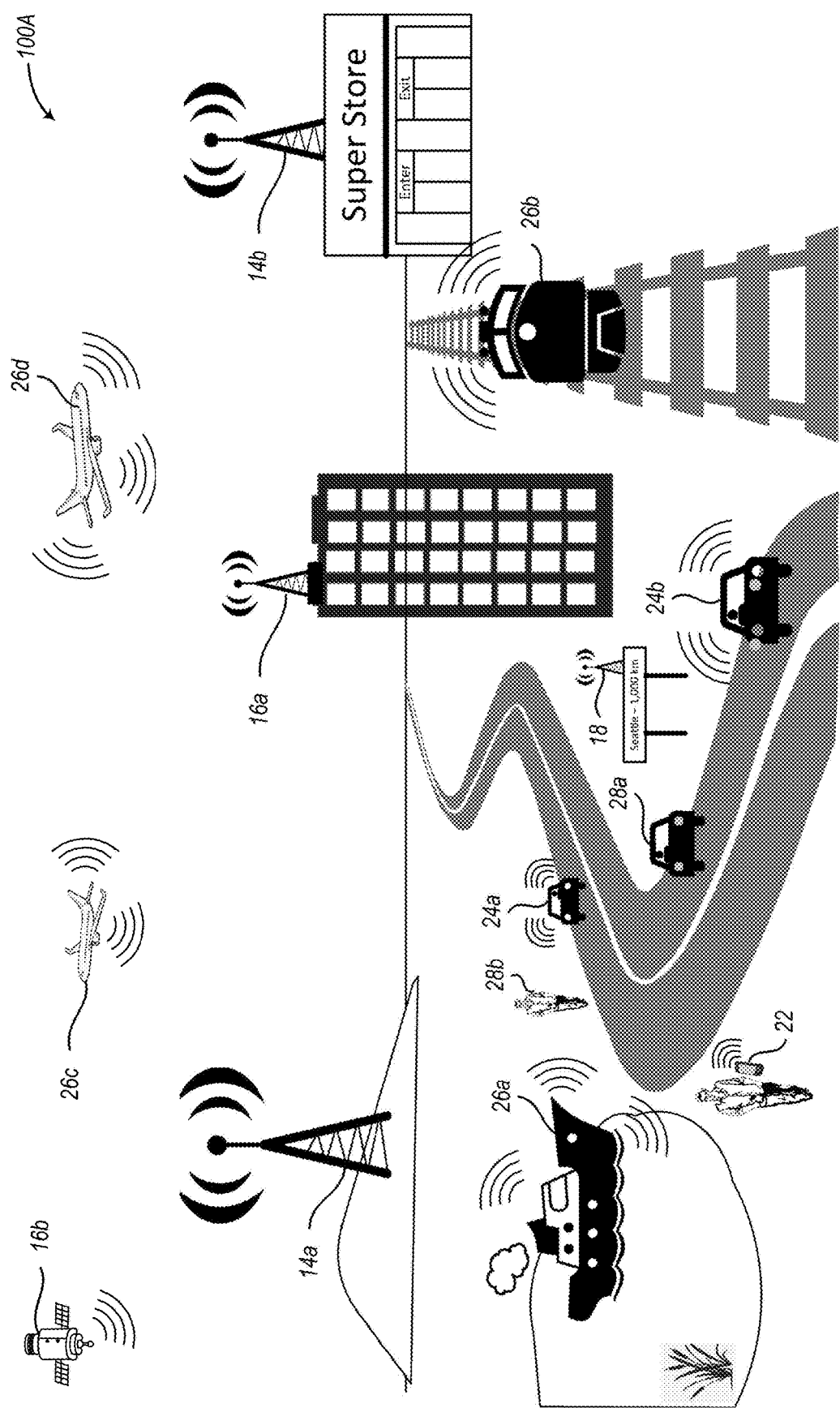
FIGS. 1A-1C illustrate context diagrams of an environment for establishing a cognitive heterogeneous ad hoc mesh network in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

As referred to herein, an "object" is a physical thing or item. Examples of objects include, but are not limited to, cars, planes, trains, boats, people, buildings, or other mobile or stationary things. Objects include participant objects and non-participant objects, which can be mobile or stationary. As referred to herein, a "participant" is an object that includes a computing device that can communicate specific, predetermined types of information and data to other participant objects via line-of-sight communications. And as referred to herein, a "non-participant" is an object that does not include a computing device that can communicate the same specific, predetermined types of information and data with a participant object. As discussed in more detail herein, participants can be mobile or stationary and may include computing devices of different sizes having different computing or networking capabilities. Throughout this disclosure, the term "participant" is used interchangeably with "participant object" and "participant computing device" and other related variations, and the term "non-participant" is used interchangeably with "non-participant object" and other related variations.

As referred to herein, "line-of-sight communication" refers to wireless transmission of information from a participant to another participant without other retransmission devices. Accordingly, line-of-sight is the maximum range one participant can communicate wirelessly with another participant without significant data lose. Examples of wireless transmissions used in line-of-sight communications include Bluetooth, WiFi, ADSB, TCAS, or other protocols now known or developed in the future. In some embodiments, all communications between participants utilize a common protocol.

Figure 1B:
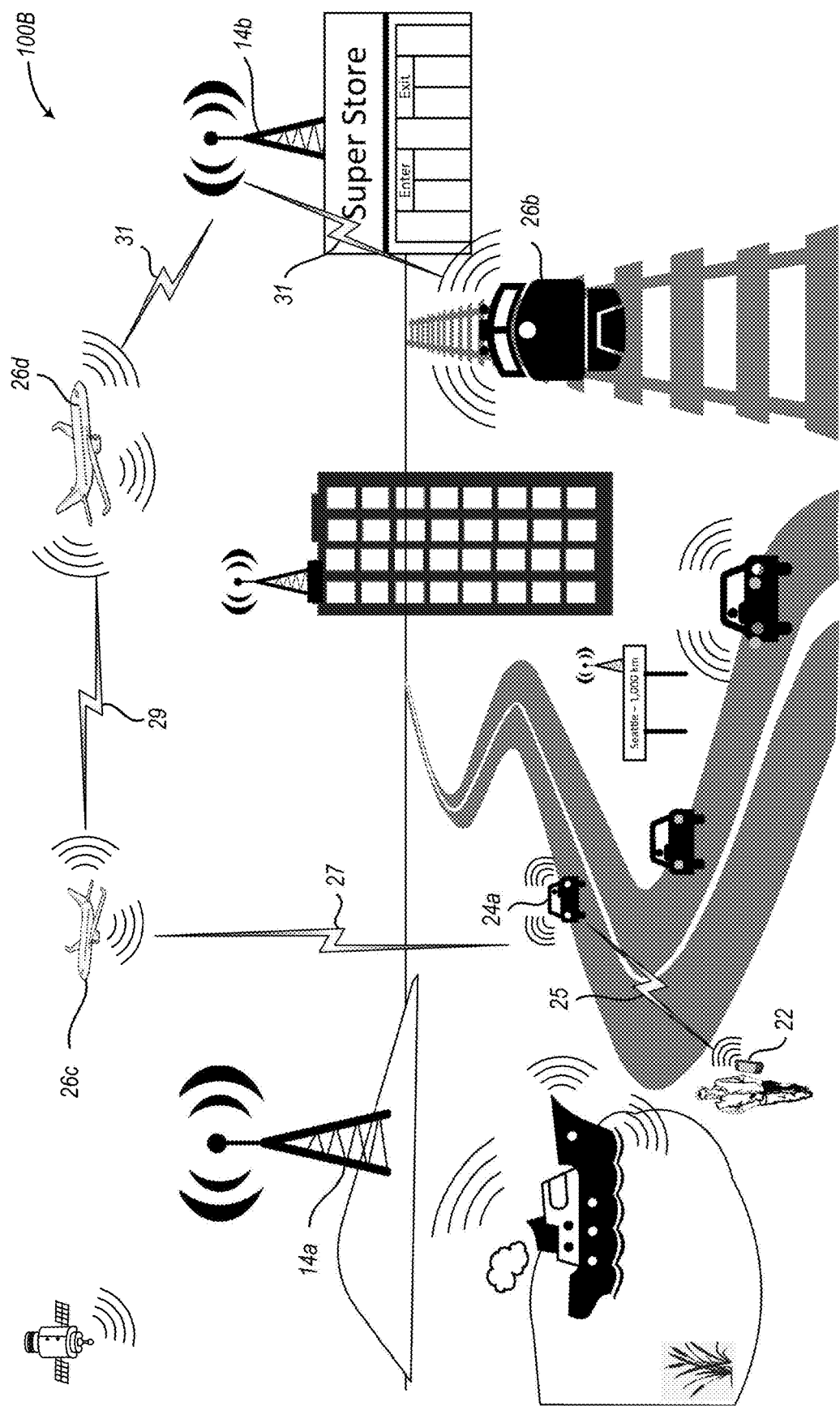
Figure 1C:
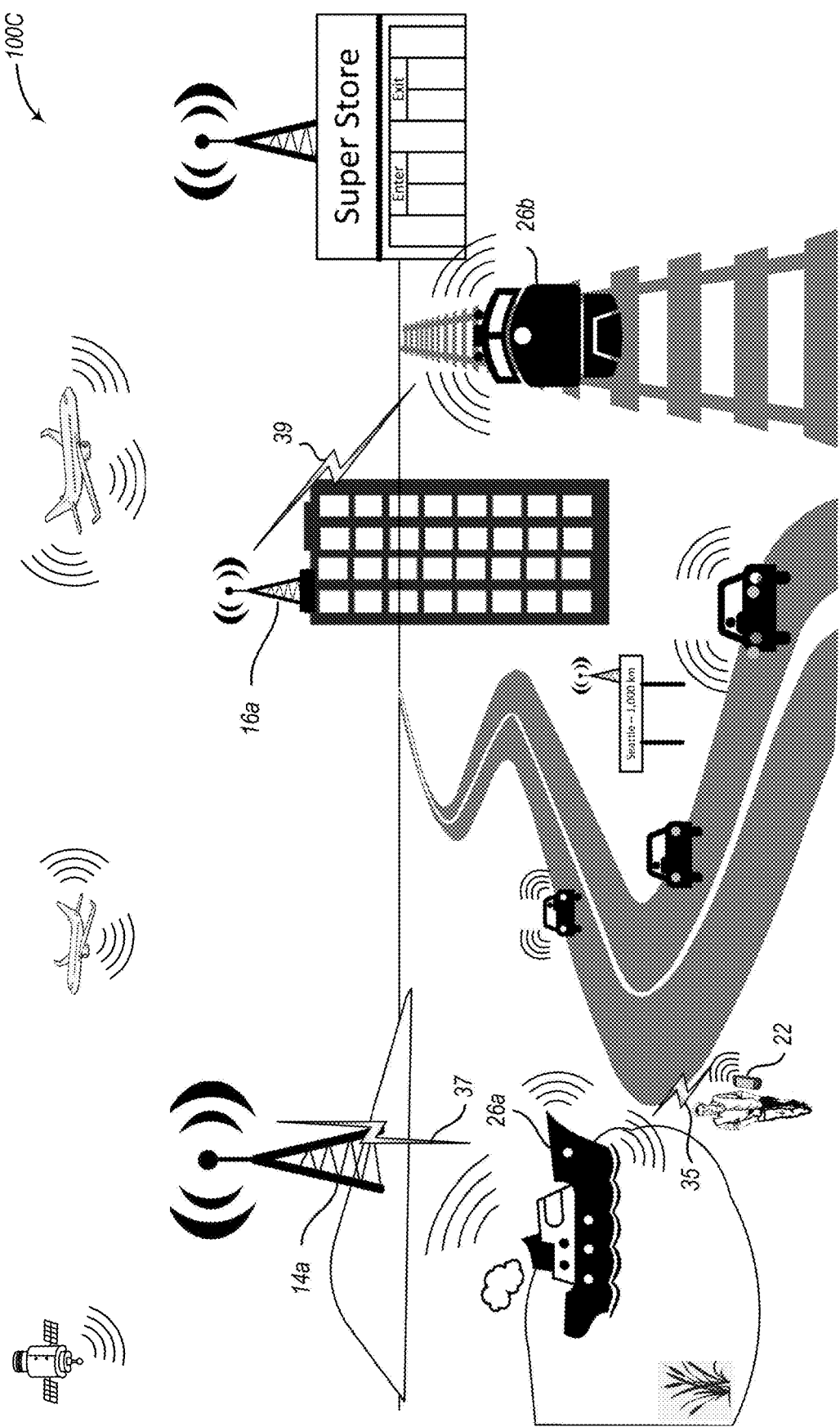

FIGS. 1A-1C illustrate context diagrams of an environment for establishing a cognitive heterogeneous ad hoc mesh network in accordance with embodiments described herein. Environment 100A in FIG. 1A includes a plurality of mobile participants (referenced in other figures as mobile participants 32), a plurality of stationary participants (referenced in other figures as stationary participants 34), and a plurality of non-participants 28. As mentioned above, the stationary participants and the mobile participants can communicate specific types of information or data with one another, but cannot communicate the same types of information with the non-participants 28a-28b, which is described in more detail below.

The plurality of mobile participants includes tier 1 mobile participants 22, tier 2 mobile participants 24, and tier 3 mobile participants 26. The three tiers of mobile participants are generally separated by the computing and networking capabilities of the computing devices associated with the mobile participant. The computing and networking capabilities may be limited or determined by the amount of power available or utilized by a mobile computing device, the amount of processing power available, the size or type or accuracy of the antenna utilized, etc.

For example, tier 1 mobile participants 22 typically have the smallest available power, lowest processing power, lowest bandwidth, shortest ranged antenna, lowest power output, lowest accuracy, and slowest update rate. Examples of tier 1 mobile participants 22 include, but are not limited to, mobile phones, laptop computers, tablet computers, wearable computing devices, or other smaller, low power, low transmission mobile computing or Internet-Of-Things devices. In the example illustrated in FIG. 1A, there is only a single tier 1 mobile participant 22, which happens to be a mobile phone in this example. However, other numbers and types of tier 1 mobile participants 22 may also be employed.

Tier 2 mobile participants 24 typically have medium power constraints, a medium amount of processing power, medium bandwidth, medium range capabilities, medium accuracy, and medium update rate. Examples of tier 2 mobile participants 24 include, but are not limited to, automobiles, small personal boats, personal aircrafts, or other medium power, medium transmission, power regenerating mobile computing devices or objects that can support such mobile computing devices. FIG. 1A illustrates example tier 2 mobile participants 24 as including automobiles 24a and 24b. However, other numbers and types of tier 2 mobile participants 24 may also be employed.

Tier 3 mobile participants 26 typically have the largest available power, highest processing power, highest bandwidth, longest transmit and receive capabilities, highest accuracy, and fastest update rate among mobile participant computing devices. Example tier 3 mobile participants 26 include, but are not limited to, commercial airline planes, semi-trucks, cargo ships, trains, or other objects that can support larger, high power, high transmission mobile computing devices or objects that can support such mobile computing devices. FIG. 1A illustrates example tier 3 mobile participants 26 as including boat 26a, train 26b, and airplanes 26c and 26d. However, other numbers and types of tier 3 mobile participants 26 may also be employed.

The plurality of stationary participants includes ground entry points 14, remote entry points 16, and access nodes 18. Similar to the three tiers of mobile participants, the ground entry points 14, remote entry points 16, and access nodes 18 are generally separated by computing and networking capabilities, and footprint size in some embodiments.

For example, ground entry points 14 typically have the largest available power, highest processing power, highest bandwidth, and longest range antenna capabilities. Example locations of ground entry points 14 include, but are not limited to, cellular towers, airports, large retail or superstores, or other locations that can support large sized, high power, high transmission stationary computing devices. FIG. 1A illustrates example ground entry points 14 as including tower antenna 14a and superstore 14b. However, other numbers and types of ground entry points 14 may also be employed.

Remote entry points 16 typically have medium power constraints, a medium amount of processing power, medium bandwidth, and medium range capabilities. Example locations of remote entry points 16 include, but are not limited to, restaurants and coffee shops, airfields and train stations, satellites, or other locations that can support medium sized, medium power, medium transmission stationary computing devices. FIG. 1A illustrates example remote entry points 16 as including store antenna 16a and satellite 16b. However, other numbers and types of remote entry points 16 may also be employed.

Access nodes 18 typically have the smallest available power, lowest processing power, lowest bandwidth, and shortest range antenna capabilities of the stationary participants. Example locations of access nodes 18 include, but are not limited to, road intersections, train crossings, road signs, mile markers, crosswalks, or other locations that can support smaller, low power, low transmission stationary computing devices. In the example illustrated in FIG. 1A, there is only a single access node 18, which happens to be a road sign in this example. However, other numbers and types of access nodes 18 may also be employed.

As described in greater detail below, the mobile and stationary participants communicate with one another to pass information from one participant to another and to detect and track non-participant objects 28, which is further illustrated in FIG. 1B.

Environment 100B in FIG. 1B provides additional details regarding environment 100A in FIG. 1A, and likewise includes a plurality of mobile participants, a plurality of stationary participants, and a plurality of non-participants. In this example, participant mobile device 22 is attempting to communicate with participant train 26b. If mobile device 22 is within line-of-sight of train 26b, then the two participants could communicate directly with one another.

But if mobile device 22 cannot directly communicate with train 26b, they will communicate with each other via other participants. For example, mobile device 22 determines that participant automobile 24a is within line-of-sight of mobile device 22. As a result, mobile device 22 sends messages destined for train 26b to automobile 24a via communication link 25. Automobile 24a then identifies another participant to forward the messages. In this example, automobile 24a forwards the messages to participant airplane 26c via communication link 27. Airplane 26c performs similar actions and forwards the messages to participant airplane 26d via communication link 29, which also performs similar actions to forwards the messages to superstore 14b via communication link 31. Superstore 14b identifies that it can directly communicate with train 26b and proceeds to forward the messages originally from mobile device 22 to train 26b via communication link 32. The communication links 25, 27, 29, 31, and 33 are line-of-sight communication transmissions from one participant computing device to another. As described elsewhere herein, these transmissions may be broadcast transmissions or they may be directional transmissions.

Each participant can select another participant through which it can forward messages based on various different criteria. For example, in some embodiments, mobile device 22 can select a nearest line-of-sight participant device through which it can forward messages. In other embodiments, mobile device 22 can select a furthest line-of-sight participant with which it can directly communicate, as described in more detail below. In yet other embodiments, mobile device 22 can select a participant based on other factors, such as signal quality, expected bandwidth, reliability, or other factors that can impact wireless transmissions. In some other embodiments, mobile device 22 can select a participant based on how few "hops" are used to get to a stationary participant, which is further discussed below in conjunction with FIG. 1C.

By having the participants communicate with one another via line-of-sight communications, messages can be passed between participants without the need for a complex stationary infrastructure, such as shown in FIG. 1B. As mentioned above, the system 100 may include stationary participants, but these participants can communicate with other participants without the need for specialty hardware for different cellular carriers or networks, rather it can rely on common line-of-sight wireless protocols, such as Wi-Fi technology under the IEEE 802.11 standards, as well as ad hoc protocols now known or developed in the future.

Environment 100C in FIG. 1C is an embodiment of environment 100B in FIG. 1B. Similar to what is described above with respect to FIG. 1B, participant mobile device 22 is attempting to communicate with participant train 26b. However, rather than utilizing only line-of-sight communication links, as discussed above in conjunction with FIG. 1B, each participant along the route may try to forward the messages to a stationary participant to gain efficiency. Since stationary participants can forward messages to other stationary participants via wired technology, they can handle additional bandwidth and forward messages with more reliability compared to only line-of-sight communication. Moreover, transmissions between stationary participants can greatly reduce the number of hops from the original sending participant to destination participant, which can improve latency issues and reduce the possibility of lost or missing data.

For example, if mobile device 22 can directly communicate with a stationary participant, such as stationary antenna 14a, then mobile device 22 can transmit messages directly to the stationary antenna 14a without forwarding them through another mobile participant. In this illustrative example, however, mobile device 22 cannot directly communicate with a stationary participant. Accordingly, mobile device 22 selects a mobile participant that has the potential to get messages to a stationary participant with the fewest number of hops between mobile participants, such as boat 26a.

Once selected, mobile device 22 sends the messages destined for train 26b to boat 26a via communication link 35. Boat 26a determines that is can communicate directly with a stationary participant, tower antenna 14a, and forwards the messages directly to tower antenna 14a via communication link 37. As mentioned herein, stationary participants can communicate with one another via wired or wireless communication networks, such as the Internet, which can improve speed and reliability for getting messages from one participant to another. Accordingly, tower antenna 14a selects another stationary participant that is closest to the destination train 26b for which to forward the messages.

In various embodiments, a network operation center server (not illustrated) maintains a list of each stationary participant and the corresponding mobile participants that are in line-of-sight of each stationary participant. Since it is possible that all mobile participants will be in line-of-sight of a stationary participant, in some embodiments, the network operation center server may also maintain a list of the mobile participants that are within a predetermined threshold number of hops away from each stationary participant. In yet other embodiments, each mobile participant periodically, at predetermined times, or within range of a stationary participant reports its position to the network operation center server. The network operation center server can then maintain a list of each mobile participant's position, which can be used to determine the closest stationary participant.

In this illustrated example, tower antenna 14a determines that store antenna 16a is the closest stationary participant to the train 26b. If store antenna 16a has a direct line-of-sight communication link with train 26b, then it forwards the messages to train 26b via communication link 39. If store antenna 16a does not have a direct line-of-sight communication link with train 26b, then it forwards the messages to another participant, which continues to forward the messages to other participants until they reach train 26b.

In various embodiments, each participant device determines whether it is more efficient to forward messages to another mobile participant or to forward it to a stationary participant. Such efficiency may be determined based on overall time to reach the destination participant, number of participant devices involved in forwarding the messages to the destination participant, or other factors.

The overarching cognitive heterogeneous ad hoc mesh network created by the mobile and stationary participants described above in conjunction with FIGS. 1A-1C provides a backbone for a multi-layered network that enables one participant to communicate with another participant, while also providing safety measures to avoid collisions among participants and non-participants.

Figure 2A:
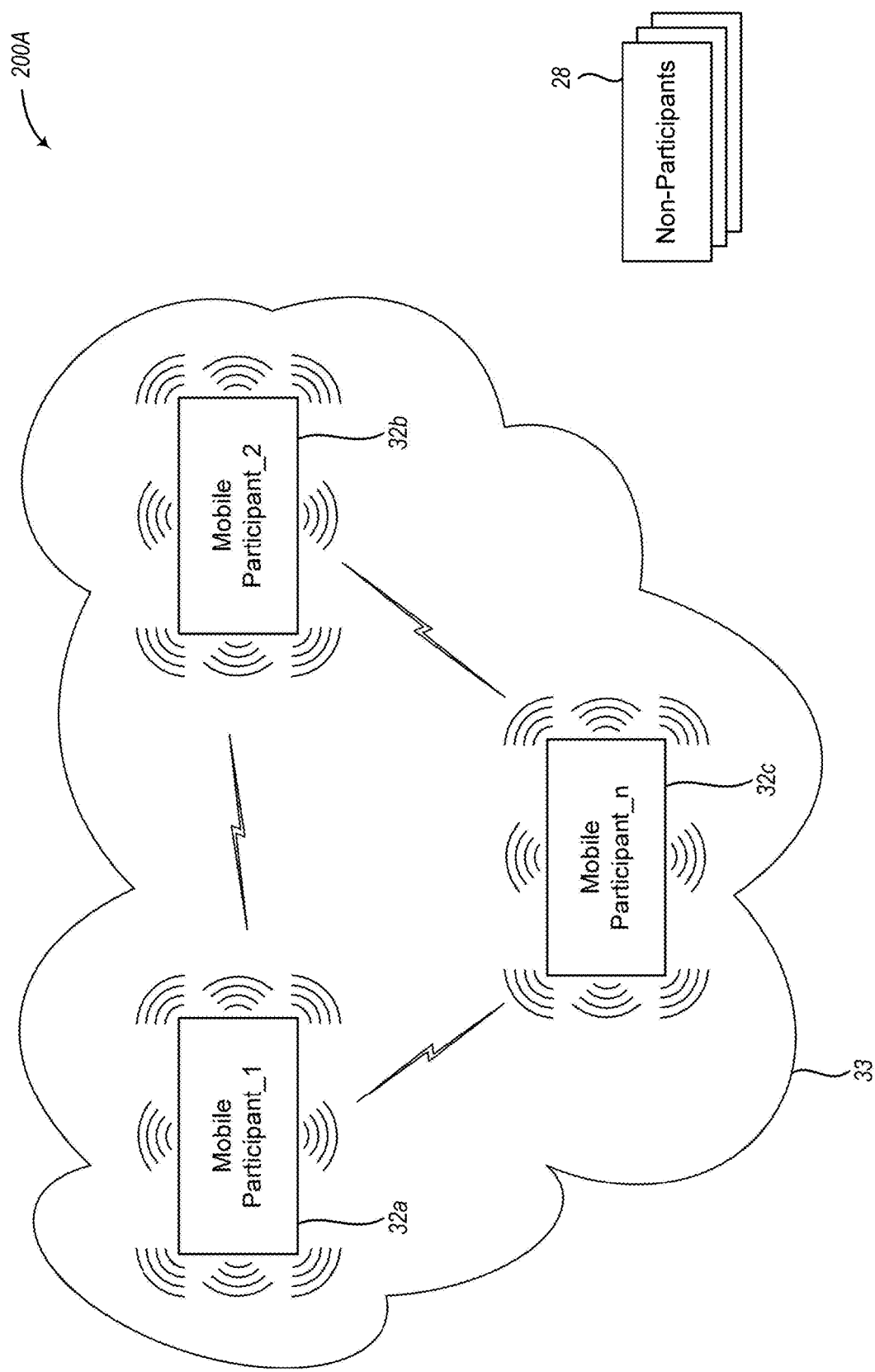
FIGS. 2A-2C illustrate block diagrams of the different layers of the cognitive heterogeneous ad hoc mesh network in accordance with embodiments described herein.
Figure 2B:
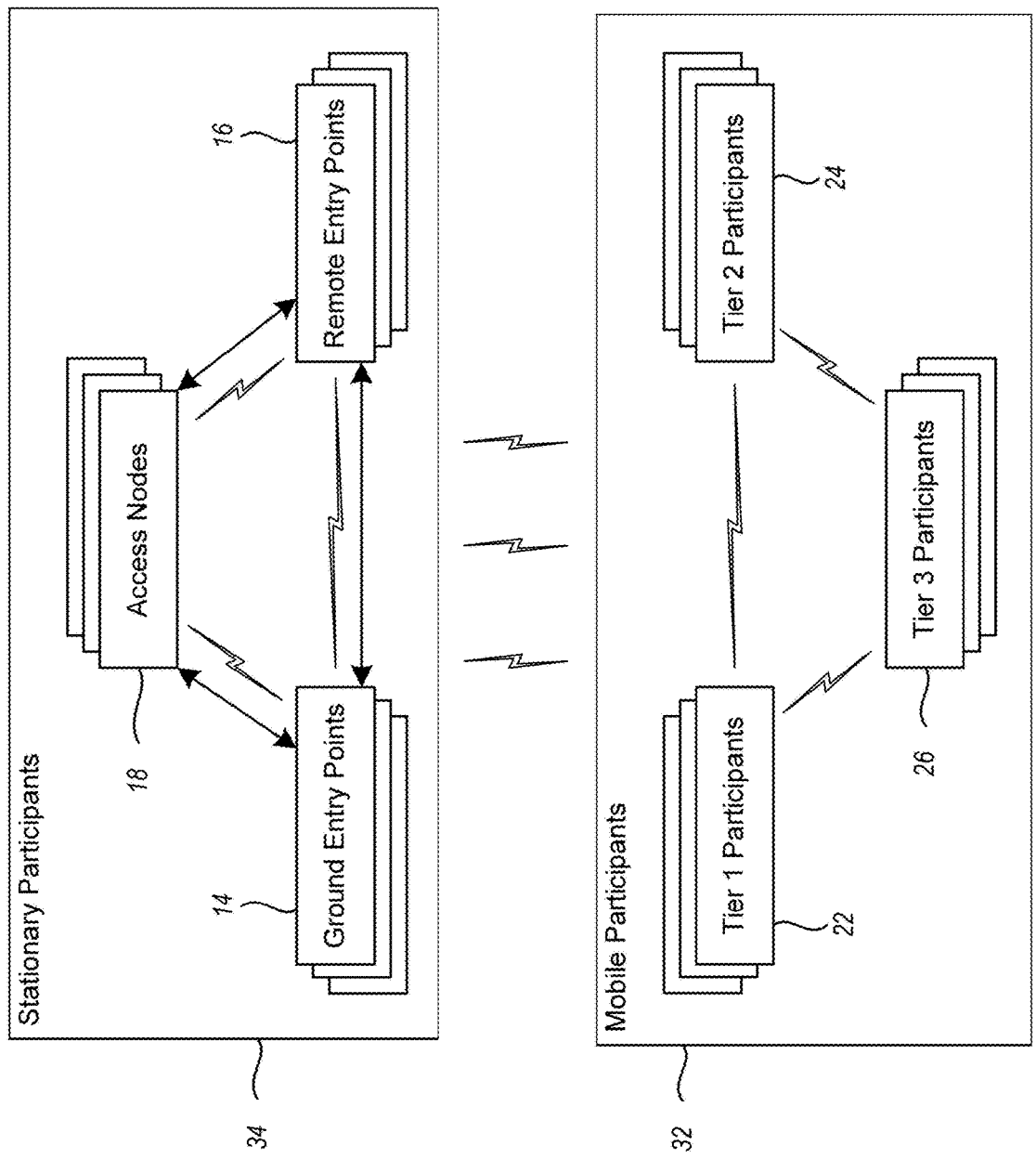
Figure 2C:
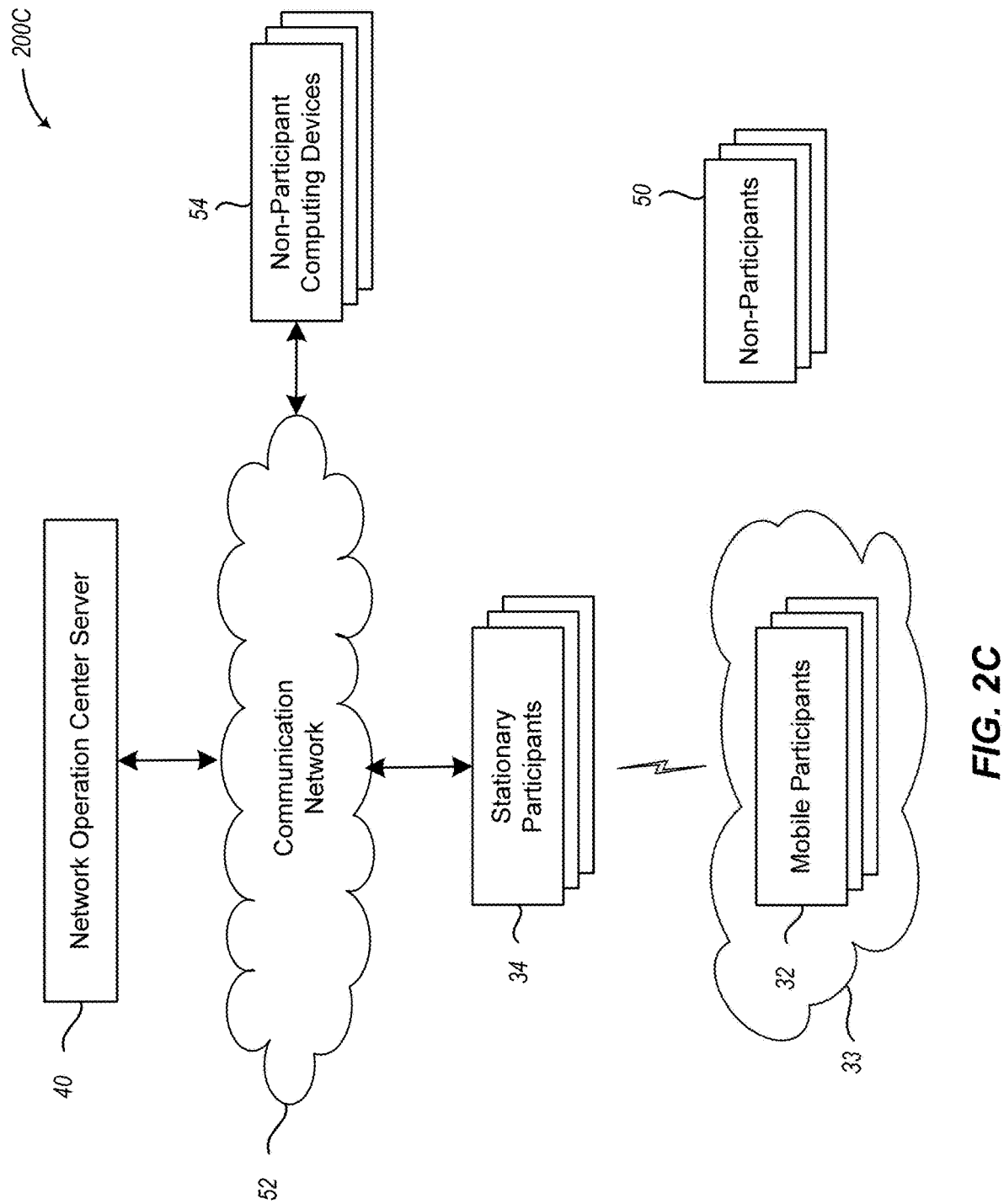

FIGS. 2A-2C illustrate block diagrams of the different layers of the cognitive heterogeneous ad hoc mesh network in accordance with embodiments described herein. FIG. 2A illustrates a block diagram of the safety, or lowest layer, of this multi-layered safety and communication network.

Example 200A in FIG. 2A includes multiple mobile participants 32a-32c. Although FIG. 2A only illustrates three mobile participants, embodiments are not so limited and one or a plurality of mobile participants may be employed. Moreover, the mobile participants 32a-32c may include tier 1 mobile participants, tier 2 mobile participants, tier 3 mobile participants, or some combination thereof.

Each mobile participant 32a-32c transmits radio frequency signals to be received by other mobile participants 32 that are within line-of-sight of the sending mobile participant 32. These signals include, but are not limited to (1) data signals that transmit messages or data to another participant and (2) notification signals that provide personalized information regarding the sending mobile participant. In some embodiments, the notification signals can include one or both of notification signals for networking and routing among participants and notification signals for safety and de-confliction of possible threats.

In various embodiments, both data signals and notification signals are transmitted via directional beams. For example, data signals are directionally focused towards the recipient participant (based on the position of the sending participant and the position of the recipient participant, which may be determined by receiving notification signals from the recipient participant). The use of directional transmissions can reduce power consumption and increase the range in which transmission can be received, while also reducing interference between transmissions in a congested space.

Similarly, notification signals are directionally focused, but are transmitted in a sequential or non-sequential 360-degree pattern. In various other embodiments, the data or notification signals may also be transmitted using non-directional broadcast signals.

The data signals are used to transmit messages or data to other participants, which is described in more detail below in conjunction with FIG. 2B. Briefly, the various communications between the mobile participants 32a-32c creates a communication network 33 among each other that enable them to communicate with one another without the use of another communication backbone, such as a cellular tower network. The notification signals provide individualized information regarding the sending mobile participant. In various embodiments, these notification signals may be referred to as self-reporting signals, since the mobile participant is independently reporting its position and kinematic information to any other mobile participants that are within line-of-sight of the transmitting mobile participant without being prompted or requested by another mobile (or stationary) participant.

The notification signals serve three primary simultaneous purposes: (1) to notify other participants of the sending participant's identity, position, and kinematic information; (2) to detect and track non-participant objects 28; and (3) to establish routing and network efficiencies. Accordingly, a mobile participant does not need to use separate sensors to detect and track non-participants while also sending separate signals to notify other participants of the sending participant's identity and location—a single type of notification signal is used for both. In other words, embodiments described herein use data transmission signals that provide information to other participants to identify and track non-participant objects.

In various embodiments, the data in the notification signal includes the mobile participant's identification information, geolocation, kinematic information, throughput capabilities, frequency capabilities, and other information. In various embodiments, the notification signals also include transmission time information that allows for Time Distance of Arrival (TDOA) and Time of Flight (TOF) or Round Trip Timing (RTT) calculations.

The geolocation of the mobile participant may be determined via traditional methods like GPS sensors or modules, cell tower or stationary participant signal triangulation, or via notification messages from other devices or participants that know or estimate the position or location of the mobile participant. This can be accomplished with extreme accuracy and minimal latency when notification messages are echoed and supported by stationary participants. The geolocation may also be referred to as the position or location of the mobile participant.

The kinematic information may be obtained by monitoring the mobile participant's position and identifying changes over time, utilizing various sensors to calculate or determine the kinematic information, or obtaining it from another system. For example, in some embodiments, where the mobile participant is an automobile, the kinematic information, such as speed or braking status, may be obtained from the vehicle computing system via the CAN bus.

The frequency capabilities may be predetermined based on the type of hardware utilized by the mobile participant. For example, the hardware of the mobile participant may be designed to utilize IEEE 802.11p or IEEE 802.11ac, or some other wireless transmission frequencies or standards, which defines the frequency capabilities of the mobile participant. In other embodiments, the frequency capabilities may be predetermined based on government regulations regarding available frequencies. In yet other embodiments, the frequency capabilities may be defined by a user or administrator.

The throughput may be predetermined based on the type of hardware utilized by the mobile participant or on the current processing capacity or network traffic of the mobile participant or a number of other factors. For example, if the mobile participant is a smart phone that is streaming a movie for the user, then it may have a reduced bandwidth or throughput compared to a mobile participant that is a car that is not transmitting or receiving additional wireless data.

The notification signal may be broadcast (i.e., transmitted without being requested by another participant) periodically, at predetermined times, dynamically selected based on number and proximity of other mobile participants or non-participants, or at a given dynamically changing update rate. As discussed in more detail below, the rate at which the mobile participant updates the position of another participant or non-participant object changes based on a combination of the distance and closure velocity between the sending mobile participant and the other object, which can adjust how often the mobile participant transmits the notification signal.

Although described as a separate dedicated notification signal, at least some of the information in the notification signal may be included in some or all transmissions from the mobile participant. For example, in other embodiments, the header of one or more messages or transmissions sent from the mobile participant may include the identity, geolocation, and kinematic information of the mobile participant, along with the other data or information that is being transmitted.

As indicated above, the non-participants 28 can be people, cars, buildings, trees, or other objects that cannot provide the same notification signals or information contained therein to mobile participants 32a-32c. As a result, the mobile participants 32a-32c are not provided any advance notice or information regarding the positioning and movement of the non-participants 28.

As mentioned above, the mobile participants 32a-32c broadcast notification signals to inform other mobile participants of their position and movement. For example, mobile participant 32a broadcasts notification signals with information identifying itself and its respective geolocation and kinematic information without regard to the presence or location of mobile participants 32b or 32c. If mobile participant 32c is within line-of-sight of mobile participant 32a, mobile participant 32c receives the broadcasted notification signals from mobile participant 32a and utilizes the information in the notification signals, and its own location and kinematic information, to identify the position and movement of mobile participant 32a relative to itself.

From this information, the mobile participant 32c determines if mobile participant 32a poses a threat to mobile participant 32c, i.e., will, or how likely is it that mobile participant 32a will, collide or interfere with mobile participant 32c. If mobile participant 32c determines that mobile participant 32a poses a threat to mobile participant 32c, then mobile participant 32c can take evasive maneuvers, or notify a user to take evasive maneuvers, to reduce or remove the threat. This type of collision detection and avoidance may be referred to as mobile participant 32c deconflicting mobile participant 32a. If mobile participant 32a is not, or is no longer, a threat to mobile participant 32c, then mobile participant 32a has been deconflicted relative to mobile participant 32c.

Mobile participant 32b likewise broadcasts notification signals that are received by mobile participant 32c, assuming that mobile participant 32c is within line-of-sight with mobile participant 32b. Mobile participant 32c performs similar actions to determine the position of mobile participant 32b and whether mobile participant 32b poses a threat to mobile participant 32c, such as to deconflict mobile participant 32b relative to mobile participant 32c. Mobile participant 32a performs similar actions to identify and track mobile participants 32b and 32c, and mobile participant 32b performs similar actions to identify and track mobile participants 32a and 32c.

The mobile participants 32a-32c also utilize the notification signals to detect and track non-participants 28, which is discussed in more detail below in conjunction with FIGS. 4A-4E and 5A-5G. As a brief example, however, mobile participant 32c broadcasts the notification signal to those participants that are in line-of-sight. If there is a non-participant object 28 in line-of-sight of the mobile participant 32c, then the notification signal will bounce off the non-participant object 28 and mobile participants 32a-32c can receive the echoed notification signal. The mobile participant can determine that it is an echo notification signal rather than a notification signal from another participant because of the mobile participant's 32c unique identifier, location, and time stamp in the notification signal. Using the time of flight (e.g., by utilizing timestamps in the echoed notification signal) and the direction of reception of the echoed notification signal, the mobile participant 32c can determine the relative location of the non-participant 28. Moreover, the mobile participants can determine this type of information over time and use it, along with their own position and movement, to determine an approximated movement of the non-participant 28.

Although not illustrated, stationary participants may also perform similar actions as described above to identify and track mobile participants that are in line-of-sight of the stationary participant or to track non-participants that are in line-of-sight of the stationary participant.

As described above, the mobile participants 32a-32c transmit notification signals to each other to identify and track other mobile participants that are in line-of-sight, as well as to track non-participants that are in line-of-sight of the transmitting mobile participant. The mobile participants can also communicate data or information amongst themselves to increase accuracy and efficiency of each participant.

FIG. 2B illustrates a block diagram of the communication or middle layer of the multi-layered safety and communication network. Example 200B in FIG. 2B includes mobile participants 32 and stationary participants 34. The mobile participants 32 include one or more tier 1 mobile participants 22, one or more tier 2 mobile participants 24, one or more tier 3 mobile participants, or some combination thereof. The stationary participants 34 include one or more ground entry points 14, one or more remote entry points 16, one or more access nodes 18, or some combination thereof.

Each mobile participant 32 can communicate with other mobile participants 32 that are within line-of-sight of the sending mobile participant. Accordingly, tier 1 mobile participants 22 may transmit data to or receive data from other tier 1 mobile participants 22, tier 2 mobile participants 24, or tier 3 mobile participants 26; tier 2 mobile participants 24 may transmit data to or receive data from other tier 2 mobile participants 24, tier 1 mobile participants 22, or tier 3 mobile participants 26; and tier 3 mobile participants 26 may transmit data to or receive data from other tier 3 mobile participants 26, tier 1 mobile participants 22, or tier 2 mobile participants 24.

Moreover, each mobile participant 32 can transmit data to or receive data from stationary participants 34 via line-of-sight communications. Accordingly, tier 1 mobile participants 22 may transmit data to or receive data from ground entry points 14, remote entry points 16, or access nodes 18; tier 2 mobile participants 24 may transmit data to or receive data from ground entry points 14, remote entry points 16, or access nodes 18; and tier 3 mobile participants 26 may transmit data to or receive data from ground entry points 14, remote entry points 16, or access nodes 18.

Similarly, stationary participants 34 can transmit data to or receive data from other stationary participants 34 via line-of-sight communications or via wired communications. Accordingly, ground entry points 14 may transmit data to or receive data from other ground entry points 14, remote entry points 16, or access nodes 18; remote entry points 16 may transmit data to or receive data from other remote entry points 16, ground entry points 14, or access nodes 18; and access nodes 18 may transmit data to or receive data from other access nodes 18, ground entry points 14, or remote entry points 16.

Although FIG. 2B illustrates three tier 1 mobile participants 22, three tier 2 mobile participants 24, three tier 3 mobile participants 26, three ground entry points 14, three remote entry points 16, and three access nodes 18, embodiments are not so limited and embodiments may include more or fewer mobile participants 32 or more or fewer stationary participants 34 than what is illustrated.

The messages or information contained in the data transmissions may have originated by the sending participant or it may have originated by another computing device and is now being forwarded by the sending participant. In some embodiments, the data may originate at one participant and be destined for another participant. In other embodiments, the data may originate at a non-participant computing device (e.g., content servers, web servers, remote networks, etc.) and be destined for a participant. In yet other embodiments, the data may originate at one participant and be destined for a non-participant computing device.

If the sending participant is within line-of-sight to a destination participant, then the originating participant sends the message or data directly to the destination participant. But if the sending participant is not within line-of-sight to the destination computing device, then the sending participant transmits the message or data to another participant who can continue to forward the message or data toward the destination computing device, which may include one or more "hops" between mobile or stationary participants.

In some embodiments, the data signals may be transmitted whenever the participant has data to be sent and has bandwidth or computing power to transmit the data. In other embodiments, the data may be buffered for a period of time until it can be successfully transmitted from the sending participant to another mobile or stationary participant.

In various embodiments, the participants may use one of various different frequencies to transmit data signals to other participants. In some embodiments, participants scan the entire spectrum or spectrums they are physically able, and legally allowed, to transmit within. Each participant determines based on real-time and historical data what frequencies are available and the length of transmission that can be transmitted without interference on each frequency, as well as what transmitters are available on the participant. In some embodiments, the participants may utilize Dynamic Spectrum Access (DSA) to use multiple frequencies for a single transmission to make full use of the available spectrum.

In various embodiments, each participant determines a Quality of Service (QOS) and Signal to Noise Ratio (SNR) between it and each other participant in line-of-sight of that participant, as well as available frequencies to the receiving participant. The participant then assesses the data it needs to transfer and chooses the most efficient frequency with a high QOS and SNR on which to transmit. Moreover, participants may utilize additional information to select what frequencies to transmit data. For example, if a participant is in a thunderstorm, it selects frequencies that are more suitable for use in inclement weather.

The participant can cross reference the throughput and frequency abilities of the other participants to determine the path and frequency on which to send the data. Once that is determined, the participant can route the data and amplify the signal based on the frequency, distance to the chosen participant, and any known interference values it may have.

In some embodiments, each participant utilizes protocols to establish transmit priorities based on the participant's role at any given moment. For example, an aircraft prioritizes safety of flight information first, then ATC communications, navigation, identification, headquarter communication, then Internet/entertainment connectivity. A cell phone, depending on environment, may act in different ways. For example, at home, it may prioritize WiFi frequencies and prioritize voice communications, then text, then Internet, then email. However, when the cell phone is in a car traveling down the road, the cell phone can use its gyrometers and accelerometers to detect that you are in a vehicle and set the priorities for V2X (vehicle to vehicle/Infrastructure/Pedestrians/other transportation) above voice, text and Internet data exchanges. In contrast, if the cell phone is in a bus or train it may not transmit V2X information.

As mentioned above with respect to FIGS. 2A and 2B, the multi-layered safety and communication network allows each participant to track other participants and non-participants that are local or proximal to the participant, while also tracking transmitted data among participants. The multi-layered safety and communication network also includes a top layer that provides global tracking of participants and non-participants, and data communication with non-participant computing devices, which is illustrated in FIG. 2C.

FIG. 2C illustrates a block diagram of the highest layer of the multi-layered safety and communication network. Example 200C in FIG. 2C includes mobile participants 32, stationary participants 34, and network operation center server 40.

As discussed above, each mobile participant 32 self-reports its position and kinematic information to other participants that are in line-of-sight with that mobile participant. If the receiving participant of that information is a stationary participant 34, then the stationary participant transmits the mobile participant's position, and optionally its kinematic information, to the network operation center server 40 via communication network 52. In some embodiments, the mobile participants may forward positional information of other mobile participants that are not in line-of-sight of stationary participants to a stationary participant for forwarding to the network operation center server 40. The stationary participants 34 may also report their position to network operation center server 40 via communication network 52, or an administrator of the network operation center server 40 may input the position of the stationary participants 34 into the network operation center server 40. In various embodiments, the participants can correct local positioning errors based on information from other near-by participants that have a known position. For example, if errors are consistent, e.g., reports are all 200 meters higher than the actual altitude, then that node can correct its position based on a correlation check with adjacent participants. These adjustments help to mitigate positioning inaccuracies in the network.

As discussed above, the mobile participants 32 utilize the self-reporting notification signals to also detect and track non-participants 50. In some embodiments, the mobile participants 32 also report the position and kinematic information of non-participants 50 to the network operation center server 40 via stationary participants 34 and optionally one or more other mobile participants 32.

The network operation center server 40 aggregates the positional information of each mobile participant 32, stationary participant 34, and non-participant 50 to create a global picture of the location of every participant and non-participant that is in line-of-sight of a participant. In this way, each participant and non-participant can be tracked, which allows for the network operation center server 40 to provide additional safety information to mobile participants.

For example, assume a mobile participant is a car that is travelling down the freeway. The car becomes involved in an accident and suddenly comes to a complete stop. The car transmits the location of the car and the sudden deceleration to a stationary participant (or to another mobile participant that can forward the information towards a stationary participant), which can provide the information to the network operation center server. The network operation center identifies those cars (i.e., other mobile participants) that are behind the accident (based on their previously transmitted geolocation and kinematic information) and transmits information to the identified cars to automatically slow down for the accident or to provide instructions to the driver to take an alternate route.

In another example, the car that is involved in the accident may be a non-participant. A mobile participant traveling behind the non-participant car can utilize embodiments described herein to detect that the car has suddenly stopped. The mobile participant can then transmit the location of the non-participant to other line-of-sight participants, which can ultimately be forwarded to the network operation center for additional safety processing.

In various embodiments, the participants may also provide additional information to the network operation center server 40. For example, each corresponding participant may also provide a list of the other participants that are in line-of-sight of that corresponding participant. This information can be used by the network operation center server 40 to determine the paths between participants in which to transmit data. In some embodiments, at least some of the functions performed by the network operation center server 40 may be performed by one or more stationary participants, e.g., ground entry points, or by at least some of the mobile participants, e.g., tier 2 mobile participants 24. In this way a ground entry point (or tier 2 mobile participant) can create a picture of the location of every participant that is within a predetermined distance of the ground entry point (or tier 2 mobile participant).

As mentioned above, mobile participants 32 may also send data to or receive data from non-participant computing devices 54. Accordingly, the mobile participants 32 communicate with stationary participants 34 (either via line-of-sight communications or via one or more other mobile participants) to send and receive data to and from the non-participant computing devices 54 via communication network 52.

The communication network 52 may be any wired or wireless communication network that facilitates the transmission of information from stationary participants 34 to network operation center server 40. In some embodiments, communication network 52 may be the Internet.

The multiple layers of the cognitive heterogeneous ad hoc mesh network described above in conjunction with FIGS. 2A-2C provide safety and communication among participants and non-participants.

Figure 3:
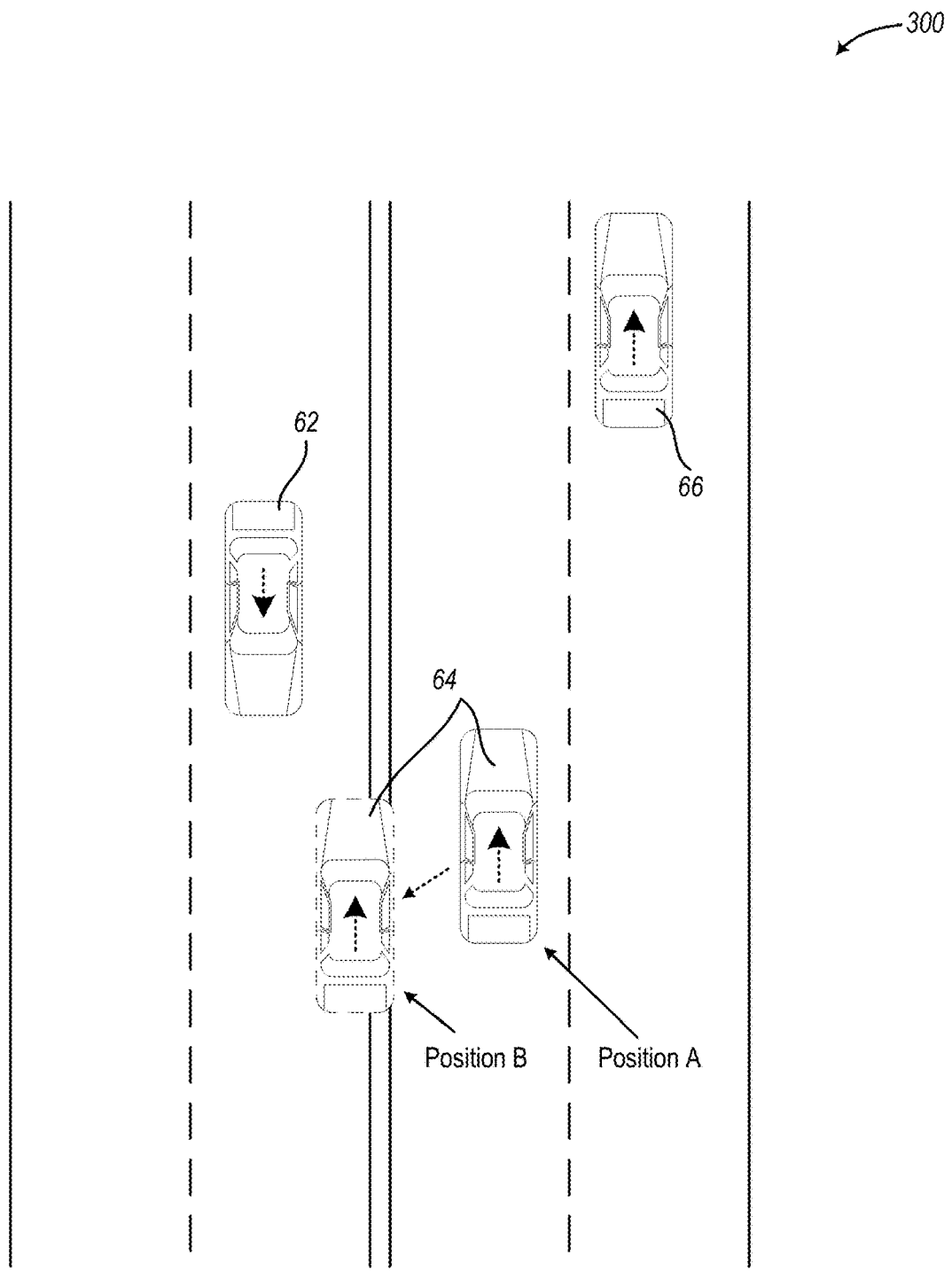
FIG. 3 illustrates a context diagram of an example scenario for using the safety layer of the cognitive heterogeneous ad hoc mesh network in accordance with embodiments described herein.

As discussed above, the security layer of the cognitive heterogeneous ad hoc mesh network utilized by participant objects allows participants to send and receive notification signals to track other participant and non-participant objects. FIG. 3 illustrates a context diagram of an example scenario for using the safety layer of the cognitive heterogeneous ad hoc mesh network in accordance with embodiments described herein.

Example 300 in FIG. 3 illustrates three automobiles, automobile 62, automobile 64, and automobile 66. Automobiles 62 and 66 are tier 2 mobile participants and automobile 64 is a non-participant. Accordingly, automobiles 62 and 66 will be referred to as the first participant 62 and the second participant 66, respectively, and automobile 64 will be referred to as the non-participant 64. The dotted arrows on the roof of each automobile indicates the direction of travel of that automobile.

The first participant 62 knows the position of the second participant 66 because the second participant 66 is periodically broadcasting notification signals with its identity, geolocation, and kinematic information, which are received by the first participant 62. Similarly, the second participant 66 knows the position of the first participant 62 because the first participant 62 is continually or periodically broadcasting notification signals with its identity, geolocation, and kinematic information, which are received by the second participant 66.

Since the non-participant 64 is a non-participant, it is not transmitting its geolocation and kinematic information, and automobiles 62 and 66 do not know where it is located. As a result, the first participant 62 does not know if the non-participant 64 is in the correct lane at "Position A" or if it is crossing the center lane at "Position B." Without knowing the position of the non-participant 64, the first participant 62 is unaware if the non-participant 64 poses a threat to the first participant 62 or not.

As briefly discussed above, automobiles 62 and 66 can utilize echo signals from their notification signal transmissions to determine the position of the non-participant 64. FIGS. 4A-4E and 5A-5G illustrate automobiles using different mechanisms to transmit notification signals and scan echo signals to determine the position of other automobiles. Although FIGS. 3, 4A-4E, and 5A-5E illustrate and are described using automobiles, similar embodiments are also employed for other types of mobile participants.

Figure 4A:
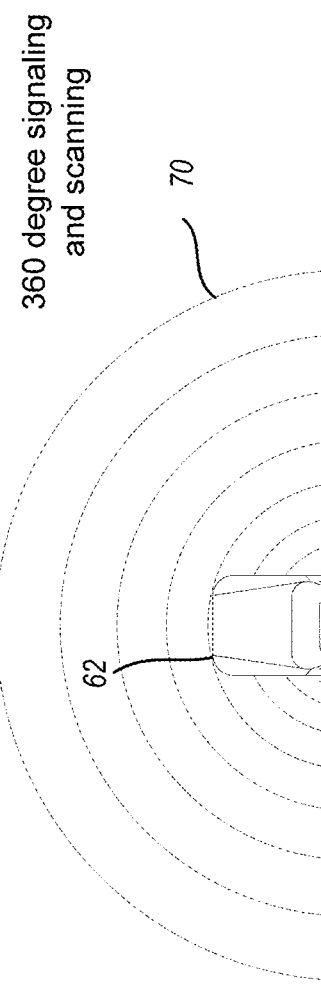
FIGS. 4A-4E illustrate context diagrams of using non-directional signaling and scanning to track an object in the safety layer in accordance with embodiments described herein.

FIGS. 4A-4E illustrate context diagrams of using non-directional signaling and scanning to track an object in the safety layer in accordance with embodiments described herein. FIG. 4A illustrates the first participant 62 transmitting non-directional notification signal 70. As shown, notification signal 70 propagates away from the first participant 62 in 360 degrees.

Figure 4B:
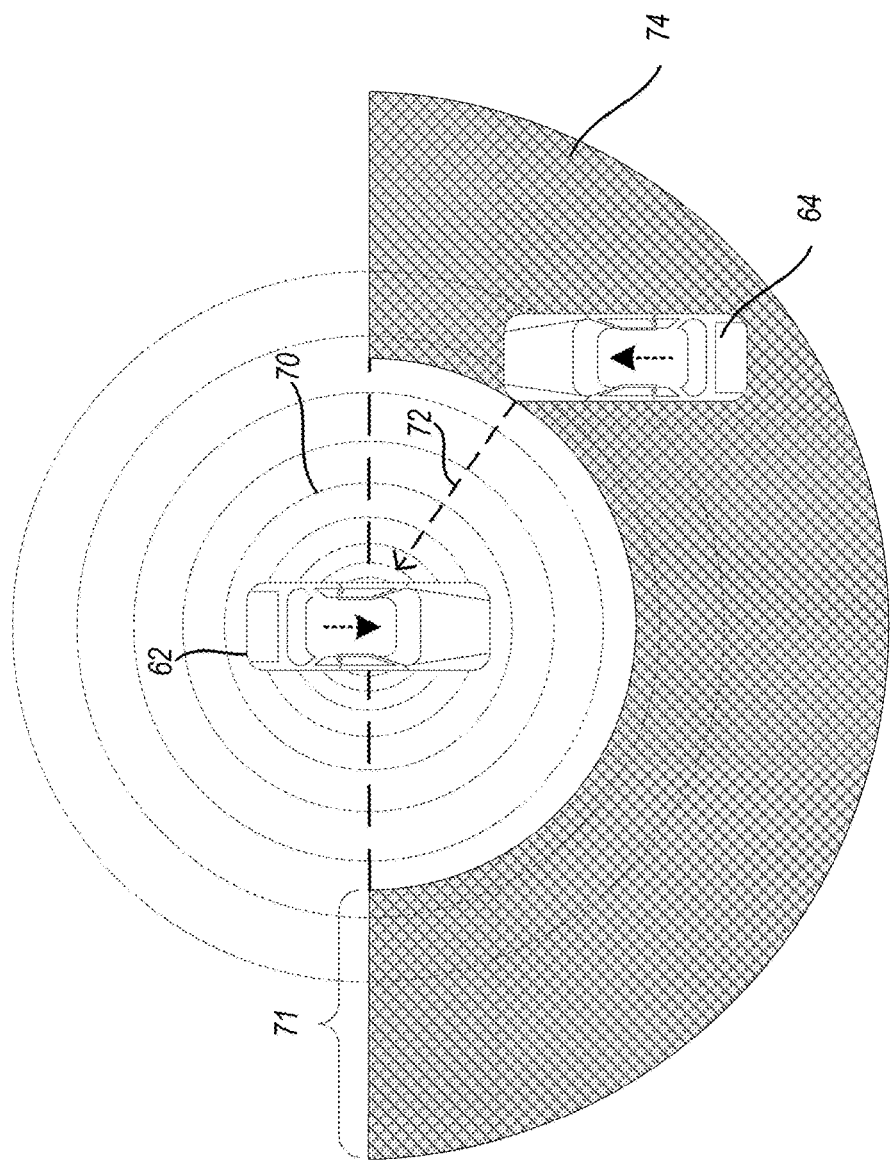

When another object, such as the non-participant 64 is in line-of-sight of the notification signal 70, then the notification signal 70 bounces off the non-participant 64 and returns to the first participant 62 as echo signal 72, which is shown in FIG. 4B. The first participant 62 calculates the approximate distance the non-participant 64 is away from the first participant 62 based on the time of flight from the transmission of the notification signal 70 to the receipt of the echo signal 72. As mentioned elsewhere herein, the notification signal is a data signal that is sent to inform other participants of the first participant's 62 position and movement. But utilizing embodiments described herein, the first participant 62 can also use the return echo signal to determine an approximate position 74 of the non-participant 64 relative to the first participant 62.

In some situations, the approximate position 74 may be 360 degrees around the first participant 62, 180 degrees, or some other reception beamwidth based on the reception antenna utilized or other calculation. For example, in some embodiments, the first participant 62 can narrow the reception beamwidth of the approximate position 74 based on changes in the distance between the first participant 62 and the non-participant 64 over time or utilizing other characteristics of the echo signal 72 (e.g., using the Doppler effect). For ease of discussion, FIGS. 4B-4E determine 180 degree reception beamwidth for the approximate position of the non-participant 64.

In various embodiments, the girth 71 of the approximate position 74 is predetermined based on the type of objects the first participant 62 may encounter, such as other automobiles, or is set by an administrator. In other embodiments, the girth 71 may dynamically change based on a variety of factors, such as the distance between the non-participant 64 and the first participant 62, whether the first participant 62 and the non-participant 64 are approaching each other or moving away, or some combination thereof. For example, the faster the first participant 62 is traveling or the further away the non-participant 64 is from the first participant 62, the greater the girth 71, whereas the slower the first participant 62 is traveling or the closer the non-participant 64 is to the first participant 62, the smaller the girth 71.

Figure 4C:
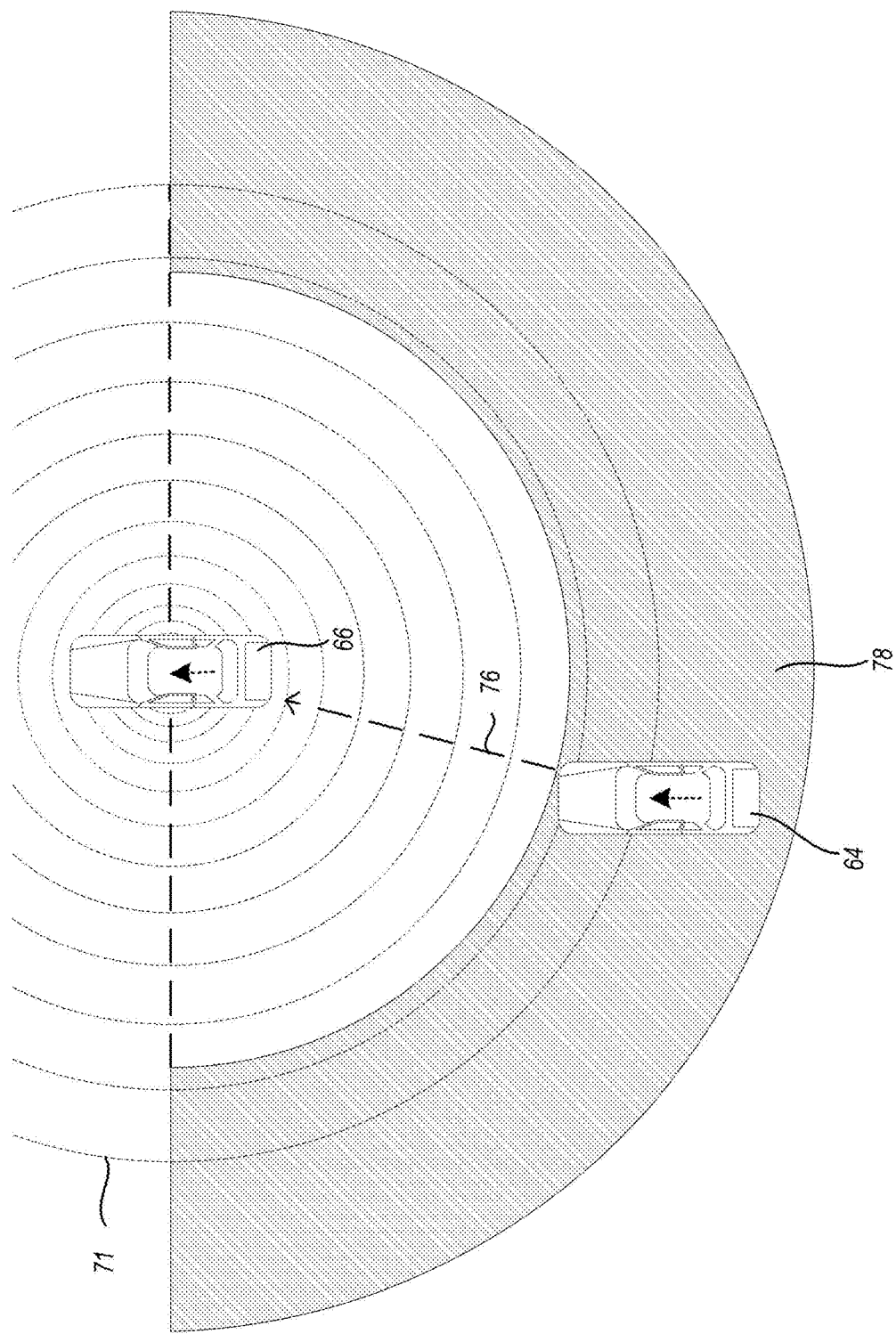

Similar to what is shown in FIG. 4B, FIG. 4C illustrates the second participant 66 as transmitting notification signal 71 in a 360 degree broadcast away from the second participant 66. The second participant 66 receives echo signal 76 bouncing off the non-participant 64. The second participant 66 calculates the approximate distance the non-participant 64 is away from the second participant 66, which is used to determine the approximate position 78 of the non-participant 64 relative to the second participant 66.

In various embodiments, the first participant 62 also determines the accuracy of the approximate position 74 for the non-participant 64. In one non-limiting example, the accuracy may be the area of the approximate position 74, such that the larger the area, the lower the accuracy, and the smaller the area, the higher the accuracy. If the accuracy is not sufficiently high, e.g., it is below a predetermined threshold value, then the first participant 62 can request the approximate position 78 from the second participant 66 to further refine the approximate position of the non-participant 64, which is illustrated in FIG. 4D.

Figure 4D:
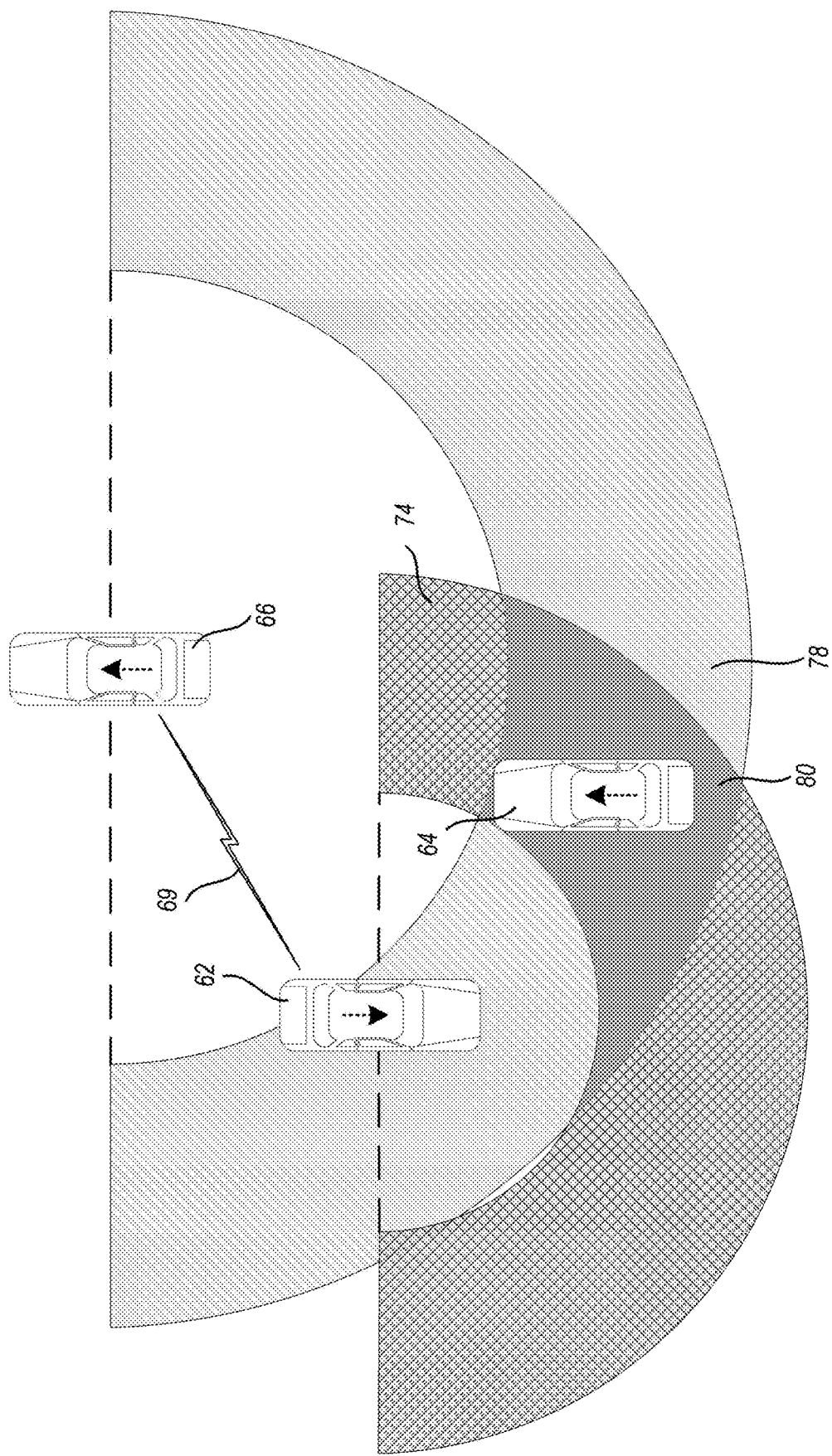

As shown in FIG. 4D, the first participant 62 sends a message via line-of-sight communication 69 to the second participant 66 requesting any positioning information it has on the non-participant 64. The second participant 66 responds to the request via line-of-sight communication 69 with any positioning information it has on the non-participant 64. In various embodiments, the positional information provided by the second participant 66 may include the approximate position 78 of the first participant 62, the accuracy of the approximate position 78, kinematic information (e.g., directional information determined from multiple positional updates), and any other information it has regarding the position and movement of the non-participant 64.

The first participant 62 compares the approximate position 74 it calculated with the approximate position 78 it received from the second participant 66 to identify any areas of overlap between the two approximate positions. The overlapping area is a new approximate position 80 of the non-participant 64. The first participant 62 also determines the accuracy of the new approximate position 80. Moreover, the first participant 62 can combine any kinematic information it has on the non-participant 64 with any kinematic information it received from the second participant 66 to determine updated kinematic information on the non-participant 64.

In various embodiments, the first participant 62 transmits the new approximate position 80 to the second participant 66 via the line-of-sight communication 69. In some embodiments, the first participant 62 may also transmit the new accuracy of the new approximate position 80 and other kinematic information regarding the movement of the non-participant 64 to the second participant 66 via the line-of-sight communication 69.

Figure 4E:
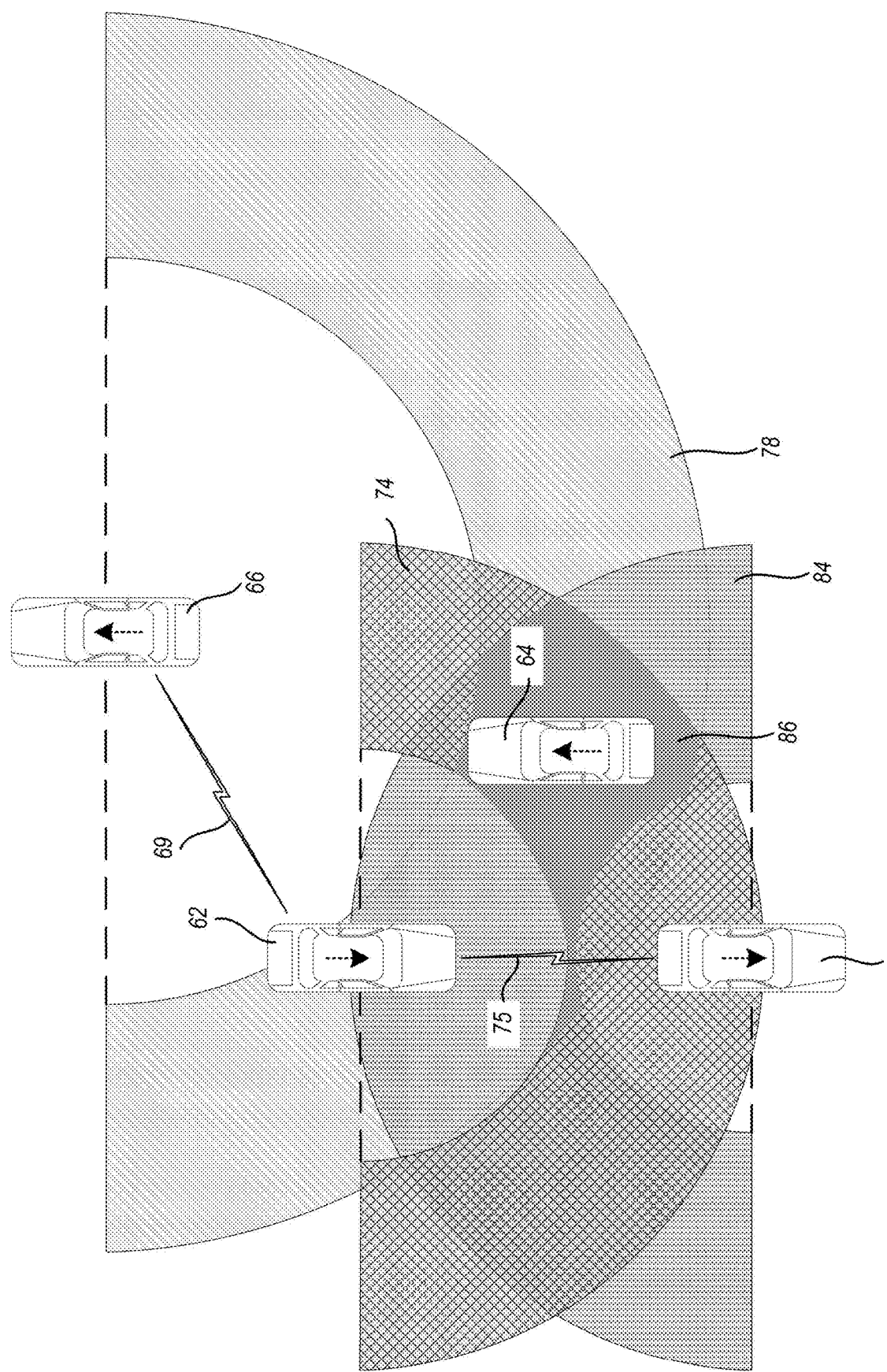

If the first participant 62 determines that the new approximate position 80 is still not accurate enough, e.g., the accuracy is below a predetermined threshold, then the first participant 62 may send another request to the third participant 82 for additional positional information, which is illustrated in FIG. 4E.

As shown in FIG. 4E, the first participant 62 sends a message via line-of-sight communication 75 to the third participant 82 requesting any positioning information it has on the non-participant 64. Similar to the second participant 66, the third participant 82 responds to the request via line-of-sight communication 75 with an approximate position 84 of the non-participant 64, the accuracy of the approximate position 84, kinematic information (e.g., directional information determined from multiple positional updates), and any other information it has regarding the position and movement of the non-participant 64.

The first participant 62 compares the approximate position 74 that it calculated with the approximate position 78 that it received from the second participant 66 and the approximate position 84 that it received from the third participant 82 to identify any areas of overlap between the three approximate positions. The overlapping area is a new approximate position 86 of the non-participant 64. In various embodiments, the first participant 62 also determines the accuracy of the new approximate position 86 and updated kinematic information for the non-participant 64 with any kinematic information it received from the second participant 66 and the third participant 82.

In various embodiments, the first participant 62 transmits the new approximate position 80 to the second participant 66 via the line-of-sight communication 69 and to the third participant 82 via the line-of-sight communication 75. In some embodiments, the first participant 62 broadcasts the new approximate position 80 of the non-participant 64, which can be received by any other participants within line-of-sight of the first participant 62.

As illustrated by the sizes of the approximate position 74 in FIG. 4B, the new approximate position 80 in FIG. 4D, and the new approximate position 86 in FIG. 4E, the approximate position of the non-participant 64 becomes more accurate with more positional information shared among automobiles 62, 66, and 82.

In various embodiments, the first participant 62 can further refine the positional information for the non-participant 64 by determining the position of the non-participant 64 from different locations as the first participant 62 moves. For example, the first participant 62 can determine first positional information for the non-participant 64 at a first time and at a first location. The first participant 62 can then determine second positional information for the non-participant 64 at a second time and at a second location. The first participant 62 can then use the first positional information and the second positional information, along with the first and second locations of the first participant 62, to triangulate the position of the non-participant 64, just as if it received the second positional information from another participant, such as described above. This utilization of the first and second positional information captured by a single participant in motion can be helpful in improving the accuracy in determining the position of the non-participant without having the benefit of getting additional positional information from another participant.

The first participant 62 can continue to update the position of the non-participant 64 at a given update rate. That update changes based on how close the non-participant 64 is to the first participant 62 and the velocity of closure between the two automobiles. In various embodiments, the velocity of closure is determined based on changes in the approximate position of the non-participant 64 over time. When the first participant 62 updates the approximate position of the non-participant 64, it broadcasts the updated approximate position to the other automobiles 66 and 82. Similar to what is described above, if the accuracy of the updated approximate position is below a predetermined threshold value, then it can request additional positional information from automobiles 66 and 82.

In some embodiments, one participant may handover positioning updates to another participant depending on various factors. For example, if second participant 66 can more accurately determine the position of non-participant 64, then first participant 62 may rely on positioning updates of non-participant 64 from second participant 66. As another example, if third participant 82 requires a higher update rate of non-participant 64, then first participant 62 may rely on positioning updates of non-participant 64 from third participant 82. In yet another example, second participant 66 and participant 82 may both provide updates on non-participant 64 to first participant 62, which can further increase the timeliness and fidelity of the estimated position and kinematics of non-participant 64. Other factors that may impact which participant performs positioning updates may include a better system with higher functionality, a better calculation of the velocity of closure, etc.

Although FIGS. 4D and 4E describe the first participant 62 as first requesting positional information for the non-participant 64 from the second participant 66 and then subsequently requesting additional positional information from the third participant 82, embodiments are not so limited. In some other embodiments, the first participant 62 broadcasts a request that is received by each automobile that is in line-of-sight of the first participant 62. If an automobile that receives the request is near or has positional information on the non-participant 64, then it transmits that information back to the first participant 62 via line-of-sight communication; otherwise, it can ignore the request.

As described above, FIGS. 4A-4E illustrate the use of omni-directional broadcasting of a notification signal to detect and track non-participant objects. However, embodiments are not so limited and directional transmissions of the notification signal may also be used.

Figure 5A:
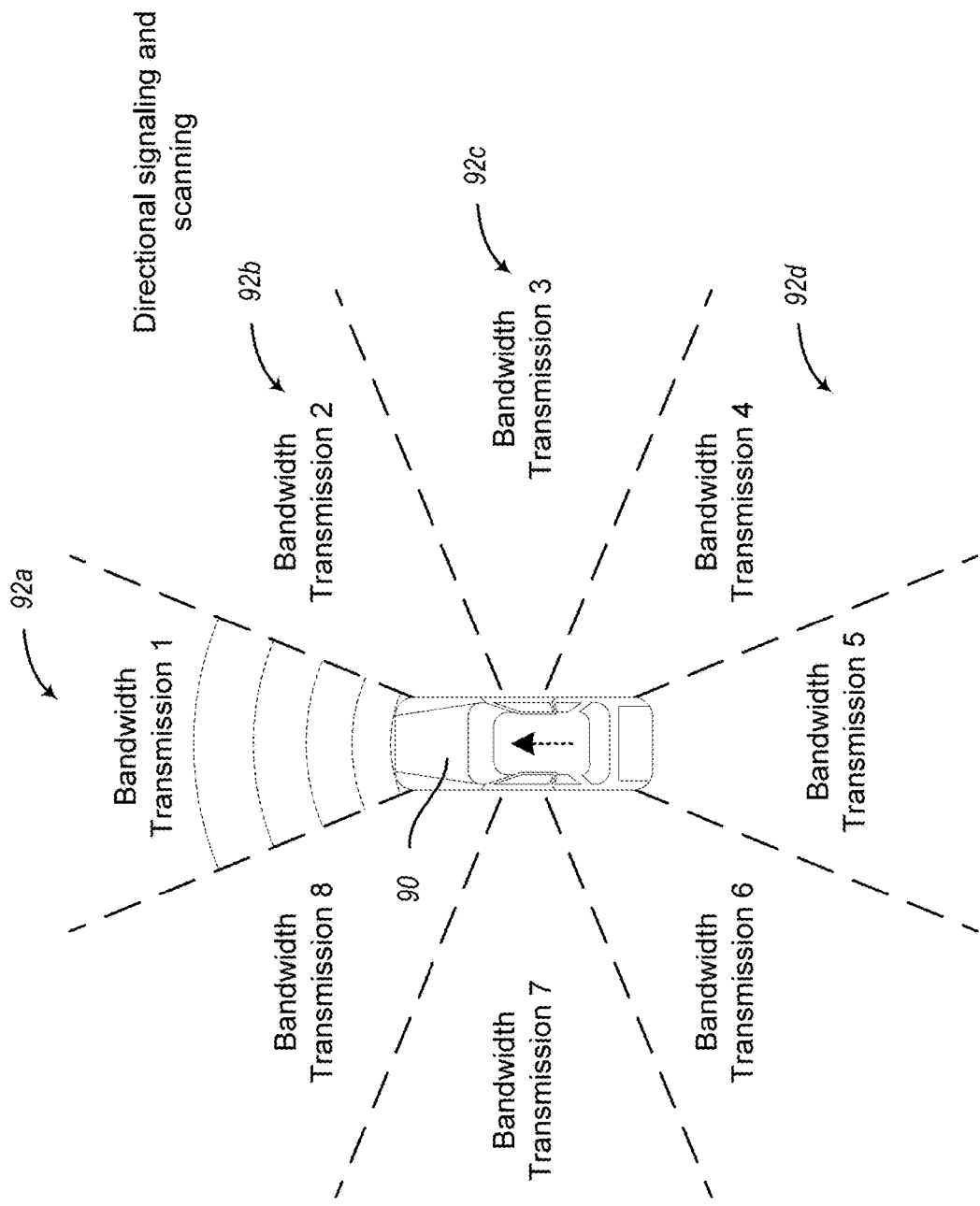
FIGS. 5A-5G illustrate context diagrams of using directional signaling and scanning to track an object in the safety layer in accordance with embodiments described herein.

FIGS. 5A-4G illustrate context diagrams of using directional signaling and scanning to track an object in the safety layer in accordance with embodiments described herein. FIG. 5A illustrates a first participant 90 transmitting directional notification signals 92a-92d. As shown, each notification signal 92 is transmitted away from the first participant 90 at a particular angle with a particular beamwidth. In various embodiments, the first participant 90 waits a predetermined amount of time for an echo signal before transmitting the next notification signal 92 at the next angle. In other embodiments, the first participant 90 may continuously transmit the next notification signal at the next angle and utilize phased, frequency, and polarity shifts to allow for simultaneous transmission of notification signals and reception of echo signals from previous notification signals. The beamwidths of the notification signals 92 may not overlap, e.g., as illustrated in FIG. 5A, or they may partially overlap one another, such as illustrated in FIG. 5D.

In the illustrated example in FIG. 5A, the first participant 90 transmits eight notification signals with 45 degree beamwidth to cover 360 degrees around the first participant 90. In various embodiments, the first participant 90 transmits the notification signals 92 in a sequential order. For example, notification signal 92a is transmitted first, followed by notification signal 92b, which is followed by notification signal 92c, and so on. A complete transmission cycle occurs when all eight notification signals 92 have been transmitted. A complete transmission cycle is used to detect non-participant objects that come within the first participant's safety net and is used to update other participants of its position. Although FIG. 5A illustrates eight notification signals being used for a complete transmission cycle, other numbers of notification signals at other beamwidths may also be utilized.

In various embodiments, a complete transmission cycle is performed at a given update rate, which may be predetermined or may dynamically change. For example, in some embodiments, the update rate may be faster when there are more participant or non-participant objects near the first participant 90, compared to when there are few or no objects near the first participant 90. In other embodiments, the update rate may be faster when the first participant 90 is moving at a higher speed compared to when the first participant 90 is moving at a slower speed.

In other embodiments, the first participant 90 maintains or utilizes individual update rates to track each particular non-participant object that is in line-of-sight or in the safety net of the first participant 90, which may be separate from the complete transmission cycle update rate. For example, the complete transmission cycle update rate may be once every five seconds, but the update rate for a particular non-participant object may be once every second. This individualized update rate dynamically changes based on the distance and velocity of closure between the first participant 90 and the tracked non-participant object.

In various embodiments, the first participant 90 transmits the notification signal 92 at an angle predicted by the last known position and kinematics of the non-participant. For example, if the non-participant object was last detected using notification signal 92d, then the notification signal 92d will again be used to update the position of the non-participant object at the individualized update rate for that object, unless the kinematic prediction falls within another beamwidth. If the first participant 90 does not receive an echo signal from the notification signal 92d, then it can immediately perform a complete transmission cycle or it can wait until the next scheduled complete transmission cycle based on the update rate for the complete transmission cycle.

As discussed elsewhere herein, each participant transmits the notification signal to detect non-participant objects and to update other participants of its position. The first participant 90 may also maintain individualized update rates for each participant that is in line-of-sight of the first participant 90. However, since the first participant 90 does not request the positional information from other participants, it can utilize only the received notification signals based on the update rate, while ignoring every other notification signal from the other participant. For example, if another participant is transmitting notification signals once every second, but the first participant 90 has an update rate of once every five seconds for the other participant, then it may utilize one of the five notification signals that it receives in a five second period while ignoring the rest. Similar to the update rate for non-participant objects, the update rate for other participants dynamically changes based on the distance and the velocity of closure between the first participant and the other participant.

Figure 5B:
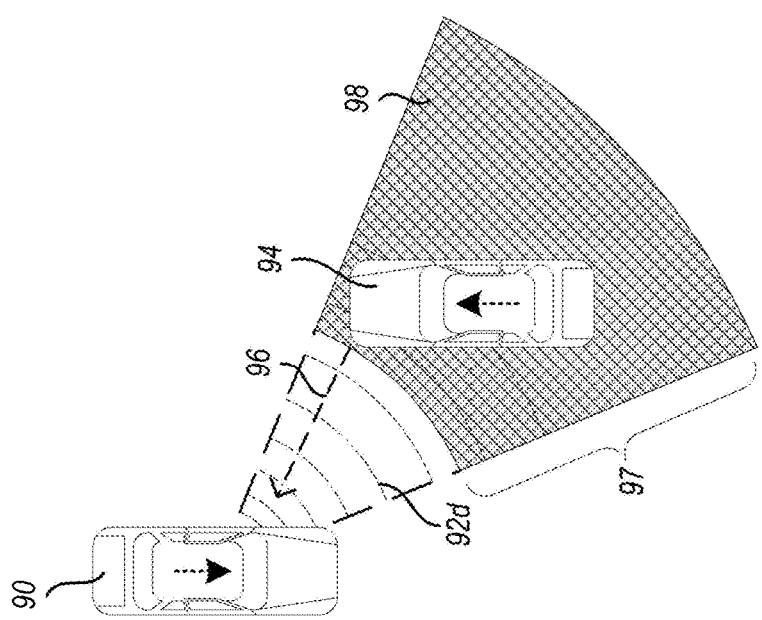

Similar to what is discussed above in conjunction with FIG. 4B, an object may come within line-of-sight of the first participant 90 while the first participant 90 is transmitting the directional notification signals 92, which is shown in FIG. 5B.

As shown in FIG. 5B, the notification signal 92d bounces off non-participant object 94 as echo signal 96. The first participant 90 calculates the approximate distance the non-participant 94 is away from the first participant 90 based on the time of flight from the transmission of the notification signal 92d to the receipt of the echo signal 96. As mentioned elsewhere herein, the notification signal is a data signal that is sent to inform other participants of the first participant's 90 position and movement. But utilizing embodiments described herein, the first participant 90 can also use the return echo signal 96 to determine an approximate position 98 of the non-participant 64 relative to the first participant 62. In various embodiments, the girth 97 of the approximate position 98 is determined similar to the girth 71 described above for the approximate position 74 in FIG. 4B.

Figure 5C:
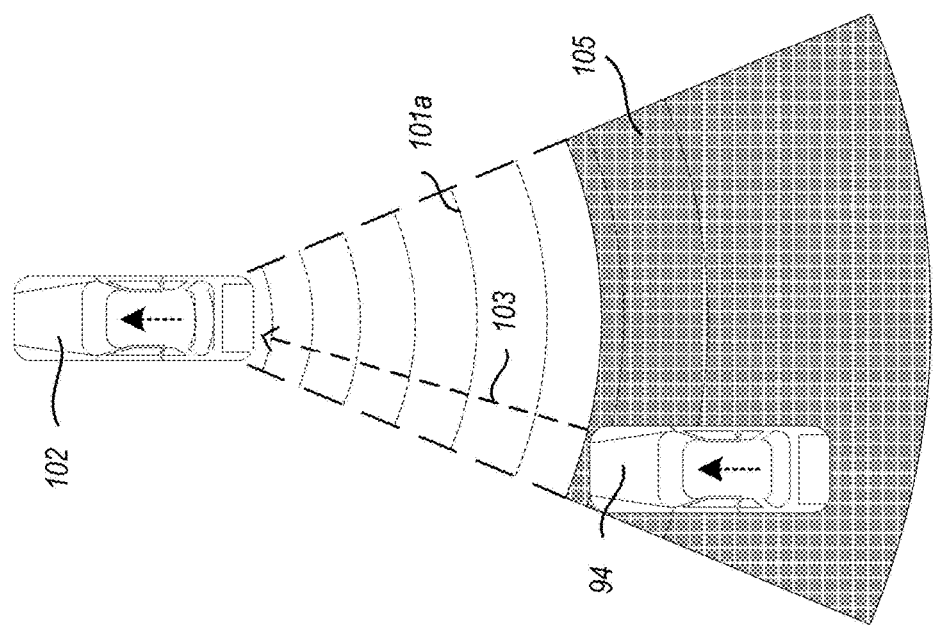
Figure 5D:
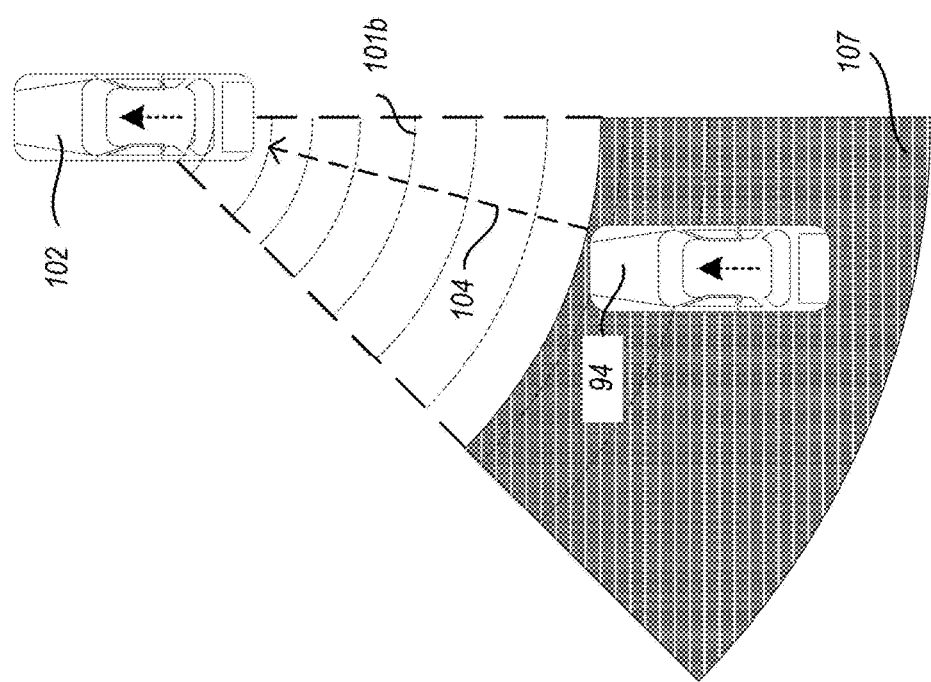
Figure 5E:
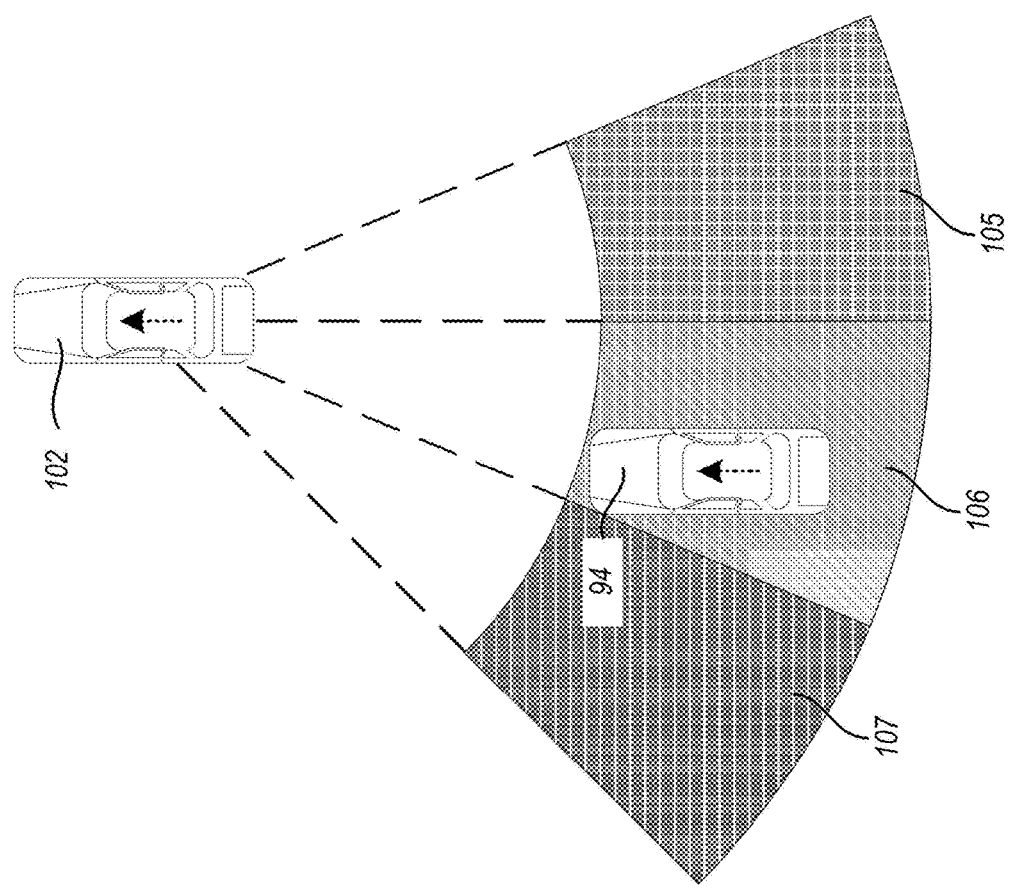

As mentioned above, in some embodiments, the beamwidth of the notification signals may partially overlap, which is shown in FIGS. 5C-5E. FIG. 5B illustrates a second participant 102 transmitting notification signal 101a away from the second participant 102. The second participant 102 receives echo signal 103 bouncing off the non-participant 94. The second participant 102 calculates the approximate distance the non-participant 94 is away from the second participant 102, which is used to determine the approximate position 105 of the non-participant 94 relative to the second participant 102.

The second participant 102 then transmits another notification signal 101b whose beamwidth partially overlaps notification signal 101a, which is shown in FIG. 5D. Again, the second participant 102 determines an approximate position 107 of the non-participant 94 based on a distance calculated using the notification signal 101b and its echo signal 104.

Since the non-participant 94 was detected using both notification signals 101a and 101b, the approximate position 105 determined from notification signal 101a and the approximate position 107 determined from notification signal 101b can be compared to determine the overlapping portion, which is illustrated in FIG. 5E. This overlapping portion is a refined approximate position 106 of the non-participant 94.

Figure 5F:
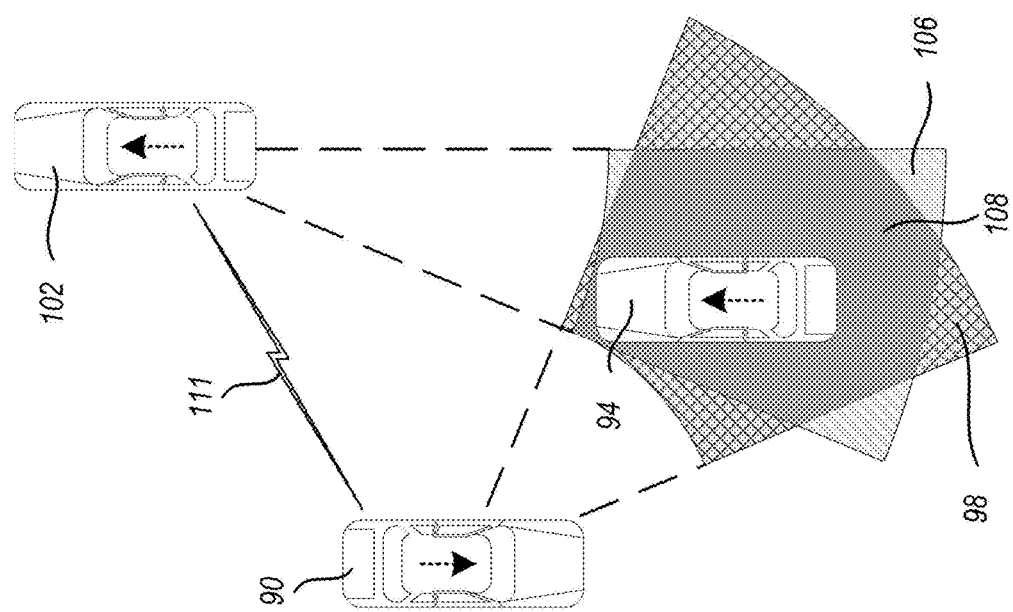

As discussed above, each participant 90 and 102 determines an accuracy of the approximate position 105 and 106, respectively. If the first participant determines that its accuracy of approximate position 105 is below a threshold value, then the first participant 90 requests positional and kinematic information of non-participant 94 from second participant 102, which is shown in FIG. 5F. In this illustrated example, second participant 102 sends the approximate position 106 and any other kinematic and accuracy information to first participant 90 via line-of-sight communication 111. The participant 90 then compares the approximate position 106 it received from second participant 102 with the approximate position 98 that it determined to identify an updated approximate position 108 of the non-participant 94.

In various embodiments, the first participant 90 transmits the new approximate position 108 to the second participant 102 via the line-of-sight communication 111. In some embodiments, the first participant 90 may also transmit a new accuracy of the new approximate position 108 and other kinematic information regarding the movement of the non-participant 94 to the second participant 102 via the line-of-sight communication 111.

Figure 5G:
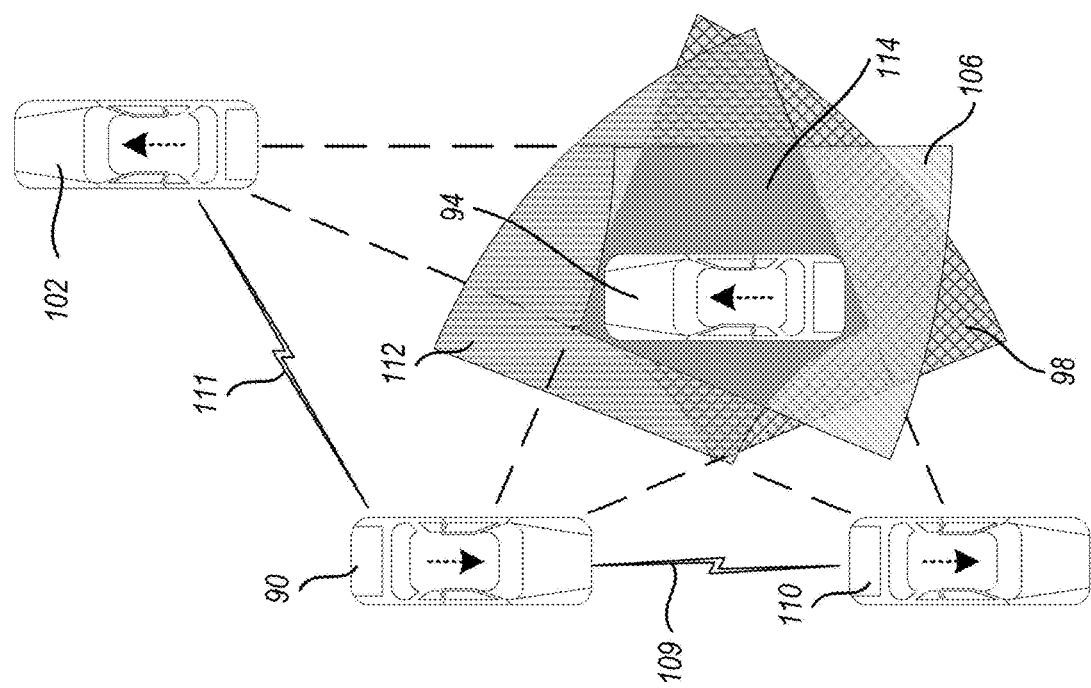

If the first participant 90 determines that the approximate position 108 is still not accurate enough, e.g., the accuracy is below a predetermined threshold, then the first participant 90 may send another request to a third participant 110 for additional positional information, which is illustrated in FIG. 5G. In some embodiments, both participants may increase their update rates or overlap beamwidths to increase accuracy or currency of the approximate position 108 to ensure safety among all participants and non-participants.

As shown in FIG. 5G, the first participant 90 sends a message via line-of-sight communication 109 to the third participant 110 requesting any positioning information it has on the non-participant 94. Similar to the second participant 102, the third participant 110 responds to the request via line-of-sight communication 109 with an approximate position 112 of the non-participant 94, the accuracy of the approximate position 112, kinematic information (e.g., directional information determined from multiple positional updates), and any other information it has regarding the position and movement of the non-participant 112. The approximate position 112 may have been determined by the third participant 110 using a single notification signal, similar to the first participant 90, or using multiple partially overlapping notification signals, similar to the second participant 102.

The first participant 90 compares the approximate position 98 that it calculated with the approximate position 106 that it received from the second participant 102 and the approximate position 112 that it received from the third participant 110 to identify any areas of overlap between the three approximate positions. The overlapping area is a new approximate position 114 of the non-participant 94. In various embodiments, the first participant 90 also determines the accuracy of the new approximate position 114 and updated kinematic information for the non-participant 94 with any kinematic information it received from the second participant 102 and the third participant 110. In some embodiments, approximate positions 98, 106, or 112 or the new approximate position 114 may be used to cue a narrower beamwidth, engage another organic sensor, or request additional positioning information from sensors of other participants depending on the accuracy of the determined position of the non-participant 94. This additional positional information can be used to further narrow or improve the accuracy of the approximate position of the non-participant 94.

In various embodiments, the first participant 90 transmits the new approximate position 114 to the second participant 104 via the line-of-sight communication 111 and to the third participant 110 via the line-of-sight communication 109. In some embodiments, the first participant 90 broadcasts the new approximate position 114 of the non-participant 94, which can be received by any other participants within line-of-sight of the first participant 90.

Similar to what is described above in conjunction with FIGS. 4A-4E, the accuracy of the approximate position of the non-participant 94 improves with additional positional information from other participants. Similarly, as illustrated by the sizes of the new approximate position 114 in FIG. 5G and the new approximate position 86 in FIG. 4E, the approximate position of the non-participant object is more accurate using directional transmission of notification signals. The first participant 90 can continue to update the position of the non-participant 94 at a given update rate, as discussed elsewhere herein.

Although FIGS. 5F and 5G describe the first participant 90 as first requesting positional information for the non-participant 94 from the second participant 102 and then subsequently requesting additional positional information from the third participant 110, embodiments are not so limited. In some other embodiments, the first participant 90 broadcasts a request that is received by each automobile that is in line-of-sight of the first participant 90. If an automobile that receives the request is near or has positional information on the non-participant 94, then it transmits that information back to the first participant 90 via line-of-sight communication; otherwise, it can ignore the request.

The operation of certain aspects will now be described with respect to FIGS. 6-9. In at least one of various embodiments, processes 600, 700, 800, and 900 described in conjunction with FIGS. 6-9, respectively, may be implemented by or executed on one or more computing devices, such as mobile participants 32.

Figure 6:
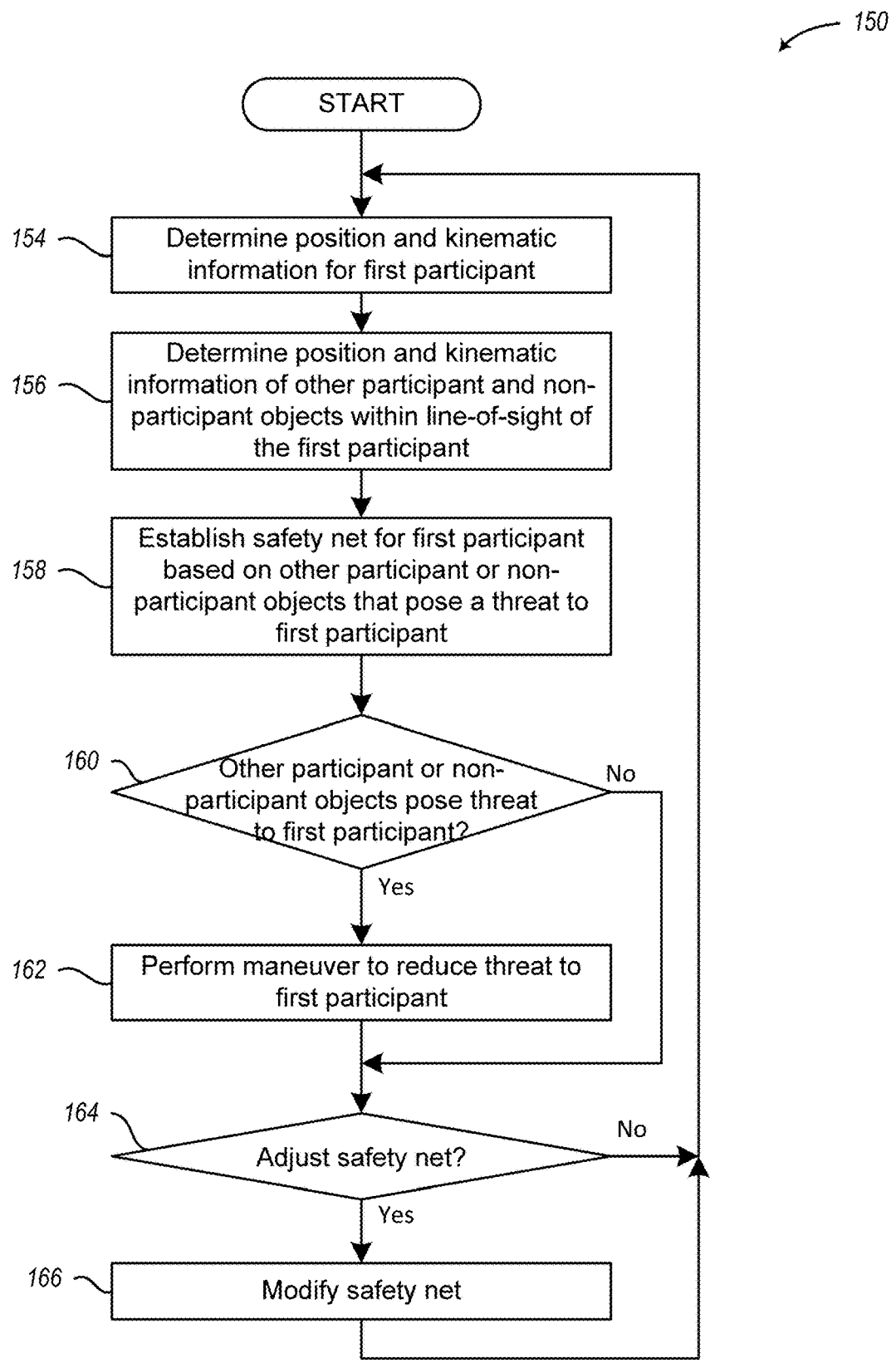
FIG. 6 illustrates a logical flow diagram showing one embodiment of an overview process for dynamically establishing and adjusting a safety net to track objects in accordance with embodiments described herein.

FIG. 6 illustrates a logical flow diagram showing one embodiment of an overview process for dynamically establishing and adjusting a safety net to track objects in accordance with embodiments described herein. Process 150 begins, after a start block, at block 154, where position and kinematic information for the first participant is determined. In some embodiments, the position of the first participant is determined based on GPS sensors, signal triangulation with cell towers or stationary participants, etc. In various embodiments, the kinematic information is determined by one or more sensors, determined by tracking the position or geolocation of the first participant over time, or received from another system. The kinematic information identifies the speed and direction of travel of the first participant.

Process 150 continues at block 156, where position and kinematic information of the other participant and non-participant objects in line-of-sight of the first participant are determined. As described above, each participant broadcasts notification signals with their identity, geolocation, and kinematic information. The first participant receives these notification signals from other participants that are in line-of-sight of the first participant, which may include an area much larger than the safety net. The first participant determines the position of the other participants relative to the first participant based on a comparison of the geolocation information of the other participants and the geolocation information of the first participant.

The first participant determines the position and kinematic information of non-participants by transmitting its own notification signals and detecting and tracking the non-participants via echo signals of the notification signals off the non-participants, such as described above in conjunction with FIGS. 4A-4E. In some embodiments, the first participant may communicate with the other participants to narrow or refine the position and kinematic information of non-participants, such as described above in conjunction with FIGS. 5A-5G.

Process 150 proceeds next to block 158, where a safety net is established for the first participant based on other participant and non-participant objects that pose a threat to the first participant. The safety net is considered to be an area surrounding the first participant that includes objects that pose a threat to the first participant. The safety net may be a defined physical space or it may be defined by those objects that pose a threat to the first participant.

For example, in some embodiments, where the safety net is a defined physical space, the safety net may be in the form of virtually any shape, such as, but not limited to, a uniform shape around the first participant (e.g., a circle or sphere), a non-uniform shape (e.g., an oval or hourglass shape), or an area with no particular shape. As such, in some embodiments, the safety net is defined by one or more specific distances away from the first participant. In other embodiments, the safety net is defined by the nearest threshold number participant or non-participant objects. The threshold number of objects may be defined by a user or may dynamically change based on the type of object. In one example, the size of the safety net is defined by the nearest non-participant object. But in another example, the shape of the safety next is defined by the three nearest objects.

In various embodiments, the shape and size of the safety net may be established based on the type or maneuverability of the first participant, e.g., a car, a mobile phone, an airplane, etc. For example, if the first participant is a car, then the safety net may be a larger physical space, compared to if the first participant is a mobile phone. In other embodiments, the safety net may be established based on the movement of the first participant. For example, if the first participant is not moving then the safety net may be in the shape of a circle, but if the first participant is traveling down a freeway, then the safety net may be in the shape of an oval or hourglass.

In other embodiments, where the safety net is defined by those object that pose a threat to the first participant, the safety net may be a list of objects that pose a threat to the first participant. For example, the safety net may include those objects where a relationship between their velocity of closure to the first participant and their distance from the first participant exceed a predetermined threshold, such as discussed below in FIG. 9.

In various embodiments, determining whether an object poses a threat to the first participant, and thus used to define the safety net, may be based on the type, maneuverability, or movement of the first participant. For example, if the first participant is a car, then the threshold for the relationship between for the velocity of closure and the distance in determining if an object poses a threat may be increased, compared to if the first participant is a mobile phone. In another example, if the first participant is not moving then the threshold may be similar in all directions around the first participant. But if the first participant is traveling down a freeway, then the threshold may be increased for object in front of the first participant and reduced for objects to the side or behind the first participant.

The above examples of the shape and size of the safety net are not limiting, but rather an illustration of the different possible shapes and sizes of the safety net.

In various embodiments, information regarding other participants and non-participants outside of the safety net may be ignored for purposes of safety. However, the positioning and kinematic information of other participants outside the safety area may be utilized to transmit data communication to the other participants, as described elsewhere herein.

Process 150 continues next at decision block 160, where a determination is made whether the other participant or non-participant objects pose a threat to the first participant. In various embodiments, the position and kinematic information of the first participant is compared to the position and kinematic information of the other participants and non-participants to determine if another participant or non-participant poses a threat to the first participant.

In some embodiments, another participant or non-participant may pose a threat to the first participant if the other participant or non-participant is within a predetermined distance from the first participant. In other embodiments, the other participant or non-participant may pose a threat to the first participant if the other participant or non-participant is on a trajectory that may intersect the trajectory of the first participant or come within a predetermined distance from the first participant.

In yet other embodiments, another participant or non-participant object may pose a threat to the first participant if the other participant or non-participant can change course and intercept the trajectory of the first participant within a predetermined closure time period. For example, assume the first participant is travelling at 60 kilometers/hour and the other participant is traveling parallel to the first participant at a distance of 10 meters and at a speed of 100 kilometers/hour. If the other participant alters course to intercept the first participant, then such an intersection could happen in approximately 0.45 seconds (if the first participant does not alter course or speed). If the predetermined closure time period is greater than or equal to 0.45 seconds, then the other participant poses a threat to the first participant, even though their current trajectories do not intercept and they are not within a predetermined distance from one another.

In various embodiments, the size, maneuverability, or type of the other participant or non-participant objects, or the first participant, may be taken into account when determining if an object poses a threat to the first participant. For example, if the other participant is a school bus, then it will take the school bus a longer time to slow down or maneuver compared to a small car. Thus, the school bus may pose a threat to the first participant at a greater distance from the first participant than the small car.

In some embodiments, a likelihood-of-collision factor is determined for each other participant and non-participant object in the safety net to determine if it poses a threat to the first participant. The likelihood-of-collision factor may be determined based on the distance, rate of closure, angle of intercept, or a combination thereof, between the other participant or non-participant objects and the first participant. For example, the closer the object is to the first participant, the higher the likelihood-of-collision factor. However, if the object is traveling away from the first participant then the likelihood-of-collision factor may be lower. Again, the size, maneuverability, or type of the other participant or non-participant objects, or the first participant, may increase or decrease the likelihood-of-collision factor. The likelihood-of-collision factor can then be compared to a threat threshold value to determine if the object poses a threat to the first participant.

If another participant or non-participant object poses a threat to the first participant, then process 150 flows to block 162; otherwise, process 150 flows to decision block 164.

At block 162, a maneuver is performed to reduce the threat to the first participant. In various embodiments, the maneuver is automatically performed by the computing device of the first participant, such as by applying the breaks or adjusting the speed or trajectory of the first participant. In other embodiments, the maneuver may be an audible or visual indicator that a user of the first participant should alter course or speed.

The type of maneuver performed is based on the position and kinematic information of the object that poses the threat, the position and kinematic information of the first participant, and the position and kinematic information of other objects. Accordingly, the maneuver is of a type to reduce the current threat without introducing additional threats by other objects. As mentioned above, a likelihood-of-collision factor is calculated to determine if an object poses a threat to the first participant. In some embodiments, this likelihood-of-collision factor may also be used to determine if and how drastic the maneuver should be. For example, the higher the likelihood-of-occurrence factor, the more drastic the maneuver.

After block 162, or if the other participants or non-participants did not pose a threat to the first participant at decision block 160, process 150 flows to decision block 164, where a determination is made whether to adjust the safety net.

In some embodiments, the determination of whether to adjust the safety net is based on whether there is a threat to the first participant. For example, if there is no threat to the first participant, then size of the safety net may be increased. However, if there is a threat to the first participant, then the size of the safety net may be decreased to remove other participants or non-participants from the safety net that do not currently pose a threat to the first participant. In this way, the first participant can utilize additional computing resources to track the object that poses a threat to the first participant.

In other embodiments, the size of the safety net may be modified based on the number of objects in the safety net. For example, if the current number of objects in the safety net exceeds a predetermined threshold number, then the size of the safety net may be reduced. Or if all other participants and non-participants have left the safety net, then the size of the safety net may be increased.

If the safety net is to be adjusted, process 150 flows to block 166 where the size of the safety net is modified; otherwise, process 150 loops to block 154 to continue to monitor other participants and non-participants in the safety net to determine if they pose a threat to the first participant.

After block 166, process 150 loops to block 154 to continue to monitor other participants and non-participants in the safety net to determine if they pose a threat to the first participant.

Figure 7:
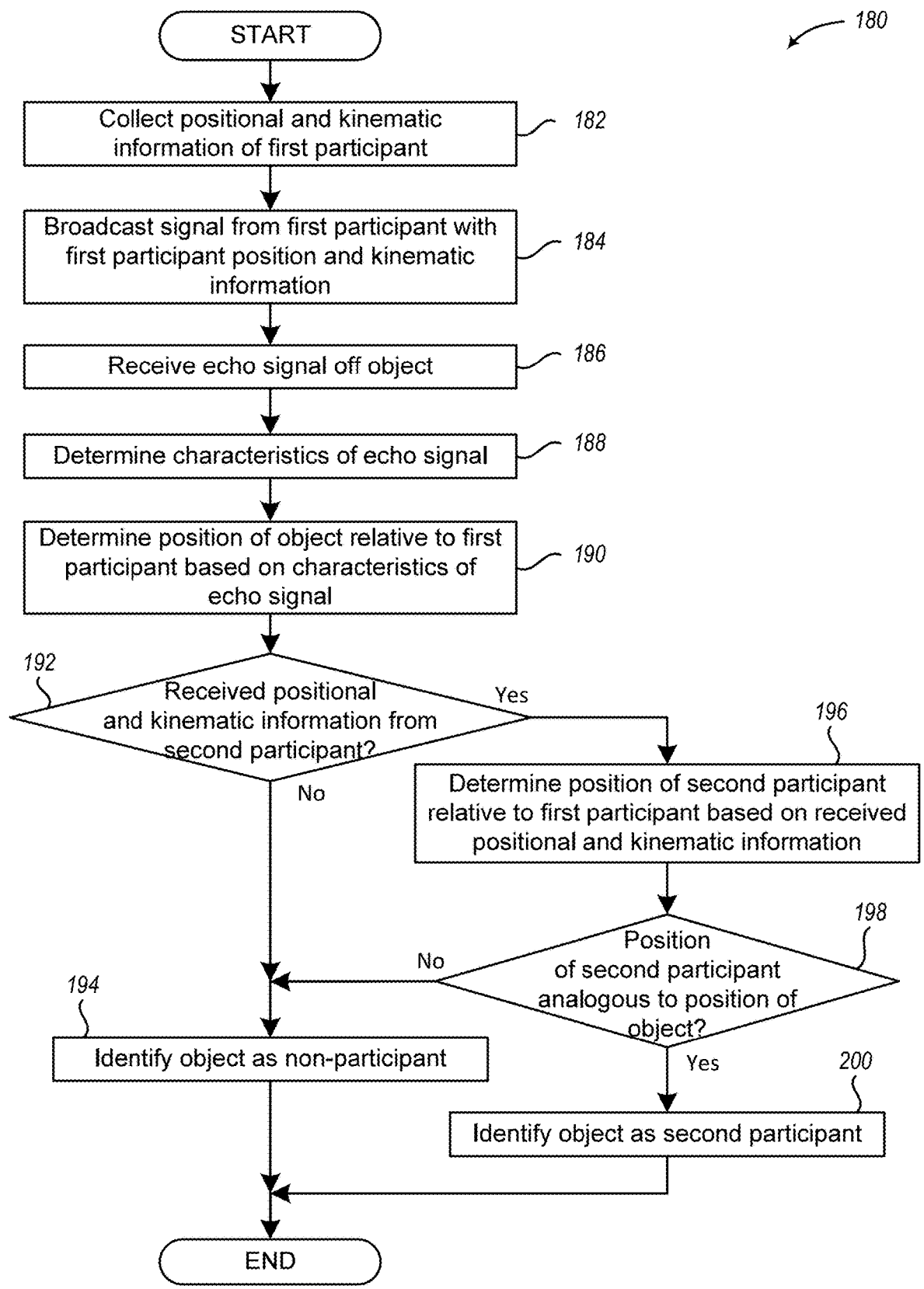
FIG. 7 illustrates a logical flow diagram showing one embodiment of a process for identifying participant and non-participant objects in the safety net in accordance with embodiments described herein.

FIG. 7 illustrates a logical flow diagram showing one embodiment of a process for identifying participant and non-participant objects in the safety net in accordance with embodiments described herein. Process 180 begins, after a start block, at block 182, where positional and kinematic information of the first participant is collected. The positional and kinematic information includes the geolocation, speed, and trajectory of the first participant. In various embodiments, block 182 employs embodiments of block 154 of FIG. 6 to determine the positional and kinematic information of the first participant.

Process 180 proceeds to block 184, where the first participant broadcasts a signal with the first participant's position and kinematic information. As described elsewhere herein, the first participant transmits a notification signal with its identity and its position and kinematic information.

Process 180 continues at block 186, where the first participant receives an echo signal off an object. In various embodiments, the first participant may include one or more radio antennas to receive the echo signal, which may be the same antennas that are used to receive similar notification signals broadcast by other participants. In other embodiments, the participant utilizes reverse polarity to enable a single antenna to both transmit and receive signals.

Process 180 proceeds next to block 188, where characteristics of the echo signal are determined. The characteristics of the echo signal may include a direction of receipt of the signal (angle of arrival), a time-of-flight value for the signal (e.g., by subtracting a transmission timestamp associated with the signal from the time of receipt), or other types of information that can be used to detect the position of the source of the echo signal.

Process 180 continues next at block 190, where a position of the object relative to the first participant is determined based on the characteristics of the echo signal. In some embodiments, the angle of receipt and the time-of-flight value are used to determine an approximate distance and angle of the object from the first participant, which can provide an estimated position of the object relative to the first participant.

Process 180, proceeds to decision block 192, where a determination is made whether the first participant has received positional and kinematic information from a second participant. As mentioned above, other participants that are in line-of-sight of the first participant are also transmitting notification signals with their identity, position, and kinematic information. If the first participant has received positional and kinematic information from a second participant, then process 180 flows to block 196; otherwise, process 180 flows to block 194.

At block 196, the position of the second participant relative to the first participant is determined based on the received positional and kinematic information from the second participant. In some embodiments, the received position of the second participant is defined by GPS coordinates, which are compared to the GPS coordinates of the first participant to determine the relative position of the second participant to the first participant. In other embodiments, the position of the second participant can be calculated based on first and second participants' locations relative to one or more stationary participants or other mobile participants (e.g., storefronts and airports).

Process 180 continues next at decision block 198, where a determination is made whether the position of the second participant is analogous to the position of the object determined at block 190. In various embodiments, the relative position of the second participant determined at block 196 is compared to the relative position of the object determined at block 190. If the difference between these two positions fall below a predetermined threshold value, then the positions of the object and the second participant can be considered to be analogous even though they are not identical. If the positions of the second participant and the object are analogous, then process 180 flows to block 200; otherwise, process 180 flows to block 194.

At block 200 the object is identified as the second participant. Accordingly, that object is a participant object and the first participant will receive tracking updates from the second participant as the second participant sends additional notification signals. After block 200, process 180 terminates or otherwise returns to a calling process to perform additional actions.

If, at decision block 192, the first participant has not received positional and kinematic information from a second participant or if, at decision block 198, the position of the second participant is not analogous to the position of the object, then process 180 flows from decision blocks 192 and 198 to block 194. At block 194, the object is identified as a non-participant. Accordingly, the first participant does not receive notification signals from the object and continues to track the object by monitoring the echo signals received from the object when sending its own notification signals.

After block 200, process 180 terminates or otherwise returns to a calling process to perform additional actions.

Figure 8:
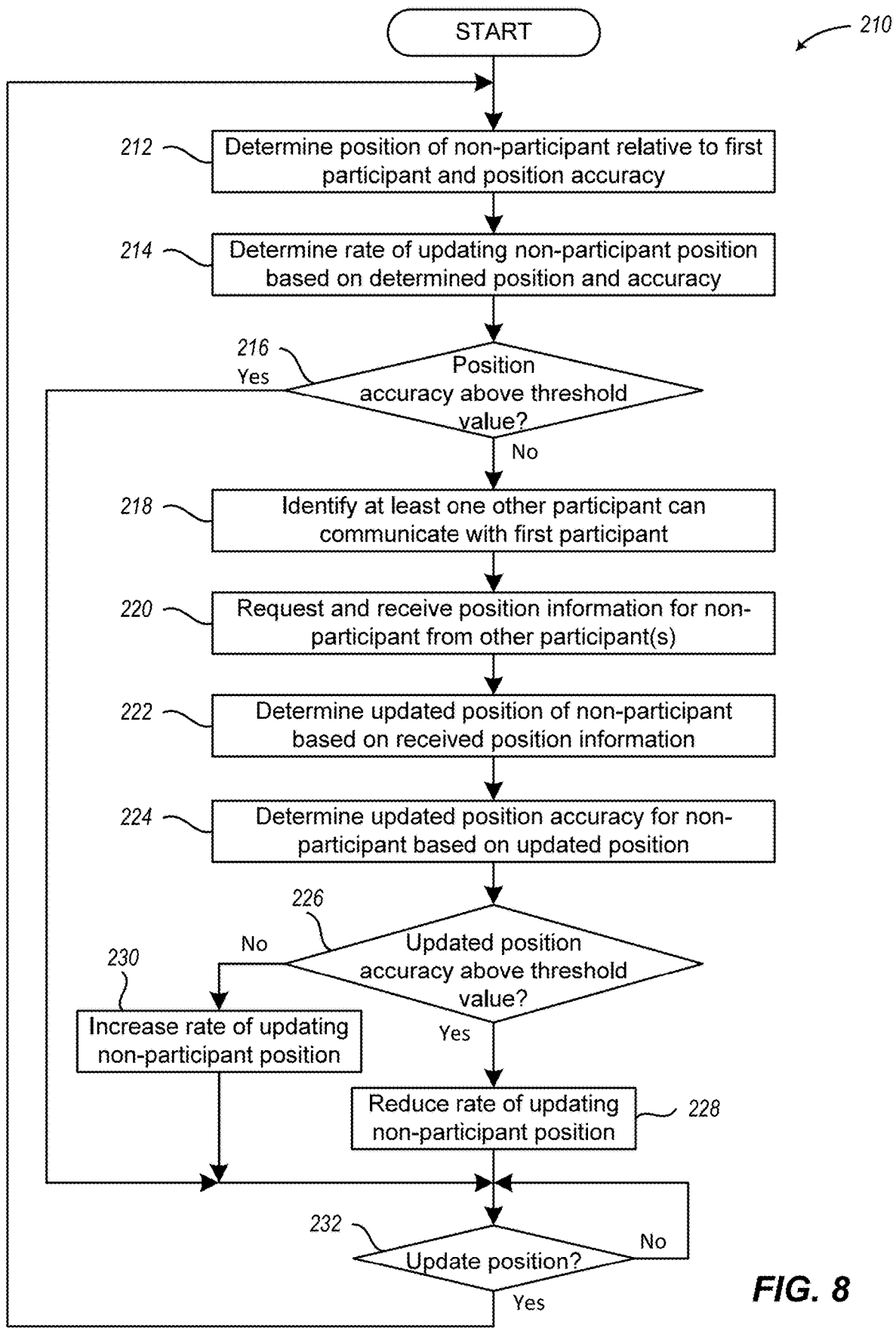
FIG. 8 illustrates a logical flow diagram showing one embodiment of a process for dynamically modifying an accuracy of a tracked-non-participant object in the safety net in accordance with embodiments described herein.

FIG. 8 illustrates a logical flow diagram showing one embodiment of a process for dynamically modifying an accuracy of a tracked-non-participant object in the safety net in accordance with embodiments described herein. Process 210 begins, after a start block, at block 212, where a position of a non-participant relative to a first participant and its accuracy are determined. In various embodiments, the position of the non-participant is determined at blocks 190 and 194 in FIG. 7.

In some embodiments, the accuracy of the position is determined based on the type of notification signal transmission and the hardware that receives the echo signal off the non-participant object. For example, in some embodiments, the notification signal is transmitted and the echo signal scanned in 360 degrees (shown in FIG. 4A). In other embodiments, the notification signal is transmitted using directional broadcasts and the echo signal is received using directional scanning (shown in FIG. 5A).

In some other embodiments, the accuracy is determined or improved based on a plurality of positional determinations over a period of time. For example, as the first participant moves (or as the non-participant object moves) changes in the characteristics of the echo signal can be used to narrow or improve the accuracy of the determined position of the non-participant.

Process 210 proceeds to block 214, where a rate of updating the non-participant position is determined based on the determined position and accuracy. The rate of updating the non-participant position, also referred to as the update rate, is the timing of how often the first participant transmits notification signals and scans for the echo signal off the non-participant object. In one non-limiting example, the update rate may be to update the position of the non-participant once every second, although other update rates may also be used.

In some embodiments, the update rate is set based on a distance and velocity of closure between the non-participant and the first participant. In other embodiments, the update rate is set based on speed, direction of travel, and anticipated undetected object speed and trajectory. For example, an aircraft flying at 1,500 meters of altitude in unrestricted airspace may assume that other aircraft could be approaching at similar speeds as their aircraft capability with a buffer for safety. While the same aircraft in restricted or a military operating area would use a speed estimation much higher based on the type of aircraft it may have to deconflict from (i.e., avoid or track for a collision threat). As another example, automobiles would have different update rates in neighborhoods vs highways vs interstates because of the speed, distance, and type of objects that may be encountered.

In various scenarios, the first participant may send additional notification signals but not scan for the echo signal, except as determined by the update rate. For example, the first participant may send 10 notification signals every second, but it may only scan for the echo signal from one of those 10 notification signals.

Process 210 continues at decision block 216, where a determination is made whether the accuracy of the position is above a predetermined threshold value. Such a determination is made by comparing the accuracy to the predetermined threshold value. If the position accuracy is above the threshold value, process 210 flows to decision block 230; otherwise, process 210 flows to block 218.

At block 218, at least one other participant that can communicate with the first participant is identified. In various embodiments, these other participants are identified by the first participant because the first participant had previously received notification signals from the other participants.

In some embodiments, the first participant may choose to identify those participants that are in the first participant's safety net. In other embodiments, the first participant may choose to identify those participants that are in a similar area as the object based on a comparison of the estimated position of the object and the positional information received from the other participants via the notification signals.

Process 210 proceeds to block 220, where the first participant requests positional information for the non-participant object from at least one other participant. In at least one embodiment, the first participant sends a targeted message to the other identified participants requesting additional positional information for the non-participant. Then at least one other participant returns position information of the non-participant (e.g., relative to that corresponding other participant) to the first participant.

As discussed herein, participants are constantly sending notification signals to self-report and track non-participant objects that are within their safety net. If the other participants are already tracking the same non-participant as the first participant, then the other participants send the positional information they have previously determined for the non-participant. If the other participants are not already tracking the same non-participant, then they can perform embodiments described herein to determine an approximate position of the non-participant by using its broadcasted notification signals.

In some embodiments, participants may automatically share the position of non-participant objects with its nearest predetermined number of other participants.

Process 210 continues at block 222, where an updated position of the non-participant is determined based on the received position information. The first participant performs various triangulation techniques with the position information it received from the other participants and the position information it had previously determined at block 212 to determine a more accurate position of the non-participant object.

Process 210 proceeds next to block 224, where an updated position accuracy for the non-participant is determined based on the updated position of the non-participant. In various embodiments, the updated position accuracy is determined based on the number of other participants that provided positional information for the non-participant object. In other embodiments, the updated position accuracy is determined based on the position of the other participants relative to the approximate position of the non-participant and the position of the first participant. For example, if each of the other participants is in very close proximity to the first participant and the non-participant is some distance away, the accuracy of the determined position of the non-participant may not greatly improve. But if the first participant and the other participants are positioned around the non-participant object, such as in a triangular fashion, then the accuracy will greatly improve.

Process 210 continues next at decision block 226, where a determination is made whether the updated position accuracy is above the threshold value. In various embodiments, the updated position accuracy is compared to the threshold value to determine if it is above or below the threshold value. If the updated position accuracy for the non-participant is above the threshold value, then process 210 flows to block 228; otherwise, process 210 flows to block 230.

At block 228, the rate of updating the position of the non-participant is reduced. For example, if the update rate was previously once every second, then it may be reduced to once every two seconds. In various embodiments, the amount to reduce the update rate may be a fixed amount or it may be dependent on the accuracy of the position of the non-participant—the higher the accuracy, the greater the reduction in the update rate.

In various embodiments, the update rate may be reduced to a minimum threshold level to save computing resources. For example, if the first participant is operating on battery power or the battery power is below a threshold level, then the update rate may be reduced to the minimum threshold to conserve battery power. In another example, the first participant may be tracking other objects at a higher update rate and may need the sensor time and processing power to properly track the other objects. Thus, reducing the update rate to a minimum threshold level frees sensor time and processing power for the first participant to update the position of other objects. In yet other embodiments, the first participant may reduce the update rate to the minimum threshold to free up processing power and antenna utilization to transmit data or other communications.

After block 228, process 210 proceeds to decision block 232.

If, at decision block 226, the updated position accuracy is not above the threshold value, then process 210 flows from decision block 226 to block 230. At block 230, the rate of updating the position of the non-participant is increased. For example, if the update rate was previously once every second, then it may be increased to twice every second. In various embodiments, the amount to increase the update rate may be a fixed amount or it may be dependent on the accuracy of the position of the non-participant—the lower the accuracy, the greater the increase in the update rate. Additional details of how the first participant may increase the update rate are discussed below in conjunction with FIG. 10. After block 228, process 210 proceeds to decision block 232.

At decision block 232, a determination is made whether to update the position of the non-participant based on the update rate. In various embodiments, this determination is based on the update rate and a timer from the last position update. If the position of the non-participant is to be updated, process 210 loops to block 212 to determine a new position of the non-participant and a new position accuracy of that position; otherwise, process 210 loops to decision block 230 to continue to wait to update the position of the non-participant device based on the update rate.

Figure 9:
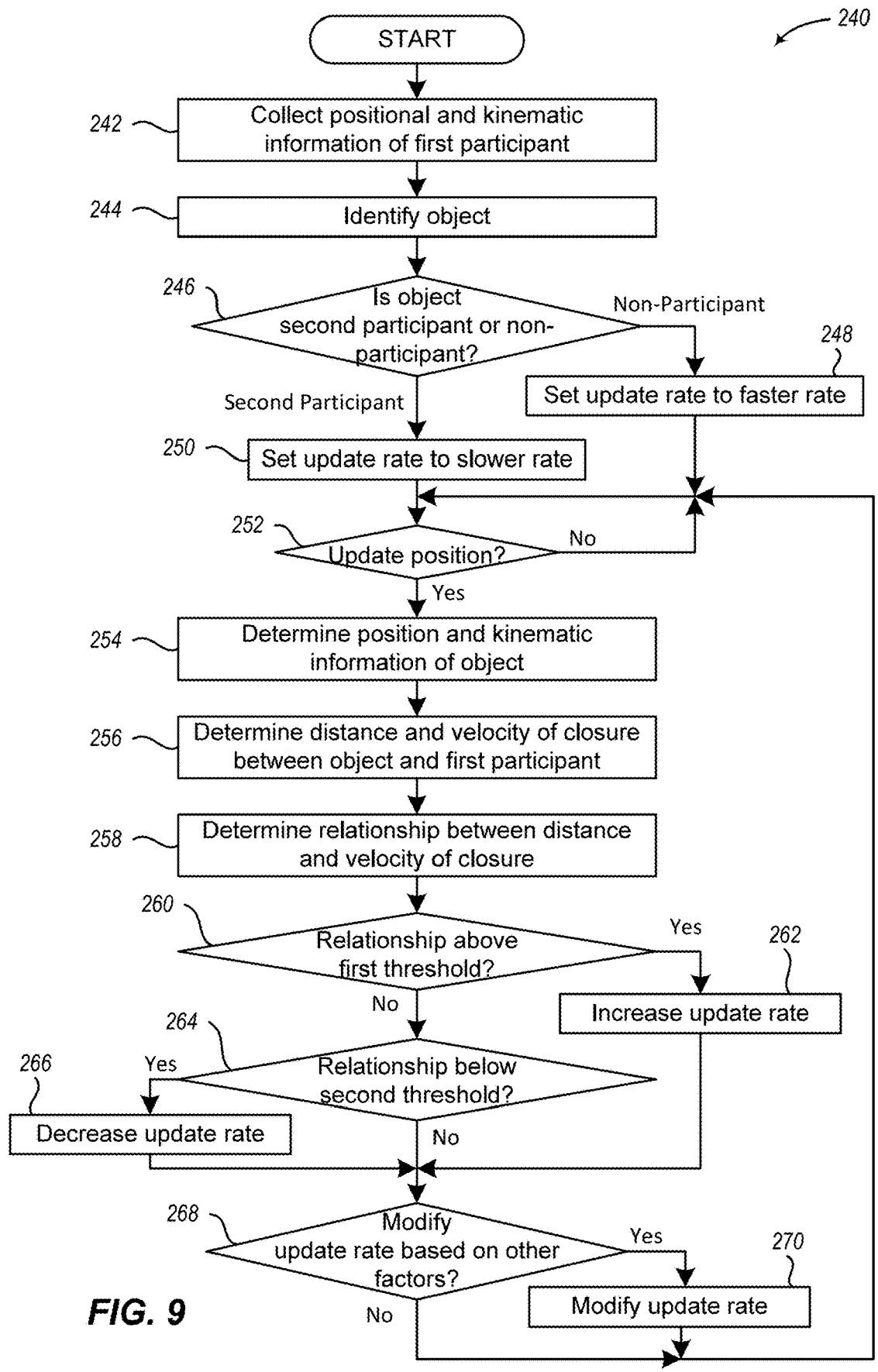
FIG. 9 illustrates a logical flow diagram showing one embodiment of a process for dynamically modifying the tracking update of a non-participant object in accordance with embodiments described herein.

FIG. 9 illustrates a logical flow diagram showing one embodiment of a process for dynamically modifying the tracking update of an object in accordance with embodiments described herein. Process 240 begins, after a start block, at block 242, where positional and kinematic information of a first participant is collected. In various embodiments, block 242 performs embodiments of block 154 in FIG. 6 to determine the positional and kinematic information for the first participant.

Process 240 proceeds to block 244 to identify an object. In various embodiments, block 244 employs embodiments of process 180 in FIG. 7 to identify either a participant or non-participant object.

Process 240 continues at decision block 246, where a determination is made whether the object is a second participant or a non-participant. This determination is made based on whether the first participant has received a notification signal from the object, i.e., a participant. In at least one embodiment, the object is identified at block 194 in FIG. 7 as a non-participant and at block 200 as a participant. If the object is a non-participant, process 240 flows to block 248; but if the object is a participant, process 240 flows to block 250.

At block 248, the update rate at which the position of the non-participant is updated is set to a faster rate. Since the first participant does not receive updates from the non-participant regarding its position and kinematic information, the first participant should update the position of the non-participant more frequently. Thus, the update rate is increased for the non-participant object. In some embodiments, the amount to increase the update rate is predetermined. In other embodiments, the amount to increase the update rate may be based on a combined update rate by participants for a non-participant that is commensurate with the notification update rate a participant has in the same environment. After block 248, process 240 flows to decision block 252.

If, at decision block 246, the object is a second participant, process 240 flows from decision block 246 to block 250. At block 250, the update rate at which the position of the second participant is updated is set to a slower rate. Since the first participant receives accurate updates from the second participant regarding its position and kinematic information, the first participant does not need to update the position of the second participant as often. Thus, the update rate is decreased for the second participant object. In some embodiments, the amount to decrease the update rate is predetermined. In various embodiments, the first participant will transmit only when needed based on other participants' ability to update their own notifications. If a participant can't update fast enough based on system/battery, position and/or kinematics then the surrounding participants can increase their update rates to increase accuracy or will communicate to the participant to maneuver for safety (e.g., slow down, increase distance, change heading, etc.). After block 250, process 240 continues at decision block 252.

At decision block 252, a determination is made whether to update the position of the object based on the set update rate. In various embodiments, decision block 252 employs embodiments of decision block 232 to determine when to update the position of the object and when to wait. If the position of the object is to be updated, process 240 flows to block 254; otherwise, process 240 loops to block 252 to continue to wait until the next update time.

At block 254, a position and kinematic information of the object is determined. In various embodiments, the initial position and kinematic information is determined or collected at block 244 when identifying the object. In various embodiments, block 254 employs embodiments of block 156 in FIG. 6 to determine the position and kinematic information of the object.

Process 240 proceeds to block 256, where a distance and velocity of closure between the object and the first participant is determined. In various embodiments, the distance between the object and the first participant is determined by comparing the position of the object with the position of the first participant. Similarly, the velocity of closure between the object and the first participant is determined by comparing the kinematic information of the object with the kinematic information of the first participant.

Process 240 continues at block 258, where a relationship between the distance and the velocity of closure is determined. In various embodiments, this relationship may be a combination, or weighted combination, of the distance and the velocity of closure. In at least some embodiments, a relationship score may be determined based on the distance and the velocity of closure. In at least one such embodiment, a table is stored in memory and includes various distances, velocity of closures, and a corresponding relationship score.

The following examples illustrate how the relationship score can be determined or adjusted based on the distance and velocity of closure. For these examples, assume the object and the first participant are traveling directly at each other—similar concepts are also employed when they are not traveling directly at one another.

Example 1

If the velocity of closure is 10 meters per minute and the distance is 1 kilometer, then the relationship score may be a one (assuming a relationship scale of 0 to 10, where 0 indicates that there is no chance that the object and the first participant will collide and a 10 is a very high chance that the object and the first participant will collide).

Example 2

But if the velocity of closure is 500 kilometers per hour at the same distance of 1 kilometer, then the relationship score may be an eight.

Example 3

On the other hand, if the velocity of closure is again 10 meters per minute and the distance is one meter, then the relationship score may be a nine.

These examples provide just a few non-limiting, non-exhaustive examples of how the relationship between the distance and velocity of closure can be determined, although other combinations or scores may be determined to quantize the relationship between the distance and the velocity of closure between the object and the first participant.

Process 240 proceeds next to decision block 260, where a determination is made whether the relationship between the distance and the velocity of closure exceeds a first threshold. In various embodiments, this first threshold is set such that relationships that exceed the threshold indicate that there is a high chance that the object may pose a threat to the first participant in the future. If the relationship between the distance and the velocity of closure between the object and the first participant exceeds the first threshold, then process 240 flows to block 262; otherwise, process 240 flows to decision block 264.

At block 262, the update rate is increased. Since the first threshold indicates a high chance that the object may pose a threat to the first participant in the future, the first participant is to update the position of the object at a faster rate to determine if the object actually poses a threat to the first object. The amount to increase the update rate may be a predetermined amount or it may be dependent on how much the relationship between the distance and the velocity of closure exceeds the first threshold. Additional details of how the first participant may increase the update rate are discussed below in conjunction with FIG. 10. After block 262, process 240 flows to decision block 266.

If, at decision block 260, the relationship between the distance and the velocity of closure between the object and the first participant does not exceed the first threshold, then process 240 flows from decision block 260 to decision block 264.

At decision block 264, a determination is made whether the relationship between the distance and the velocity of closure between the object and the first participant is below a second threshold. In various embodiments, this second threshold is set such that relationships that fall below the threshold indicate there is a low chance that the object may pose a threat to the first participant in the future. If the relationship between the distance and the velocity of closure between the object and the first participant is below the second threshold, then process 240 flows to block 266; otherwise, process 240 flows to decision block 268.

At block 266, the update rate is decreased. Since the second threshold indicates a low chance that the object may pose a threat to the first participant in the future, the first participant is to update the position of the object at a slower rate. The amount to decrease the update rate may be a predetermined amount or it may be dependent on how much the relationship between the distance and the velocity of closure is below the second threshold. After block 266, process 240 flows to decision block 268.

At decision block 268, a determination is made whether the update rate is modified based on other factors. Examples of other types of factors that can be used to modify the update rate include crossing trajectories; type, size, or maneuverability of object; type, size, or maneuverability of the first participant, environmental conditions (e.g., raining, cloudy, solar flares, etc.), or any combination thereof. For example, if the first participant is highly maneuverable it may need less time to adjust speed or course and, thus, can update the position of a tracked object at a slower rate, as compared to if it were less maneuverable; conversely, if the tracked objects is highly maneuverable, then the first participant may update the position of the tracked object at a higher rate because the position and course of the tracked object may rapidly change and pose a threat to the first participant. Moreover, if environmental conditions may slow down the participant or the tracked object's ability to change speed or course, or may impact the accuracy of tracking the object's position, then the update rate may be increased. If the update rate is further modified, process 240 flows to block 270; otherwise, process 240 loops to decision block 252 to update the position and kinematic information of the object based on the update rate.

At block 270, the update rate is further modified. In various embodiments, a table or database is stored with information as to how much to increase or decrease the update rate based on one or more additional factors. After block 270, process 240 loops to block 252 to update the position and kinematic information of the object based on the update rate. By changing the rate at which the position of an object is updated relative to the relationship between the first participant and the object based on a combination of the distance, velocity of closure, and angle of intercept, the first participant can better utilize additional computing resources to track objects that may pose a higher threat to the first participant, while using less computing resources to track objects that probably don't pose a threat to the first participant.

Although FIG. 9 illustrates the use of two thresholds to determine whether the update rate is increased or decreased, embodiments are not so limited. In other embodiments, a plurality of different increase thresholds may be employed, with each different increase threshold being associated with a different amount to increase the update rate. For example, if the relationship exceeds a first increase threshold, then the update rate may be increased a first amount, but if the relationship exceeds a second increase threshold, then the update rate may be increased a second amount that is larger than the first amount. Conversely, a plurality of different decrease thresholds may be employed, with each different decrease threshold being associated with a different amount to decrease the update rate. For example, if the relationship exceeds a first decrease threshold, then the update rate may be decreased a first amount, but if the relationship exceeds a second decrease threshold, then the update rate may be decreased a second amount that is larger than the first amount.

Moreover, the number of thresholds to utilize and the amount to increase or decrease the update rate may dynamically change be based on the number of objects within a predetermined area, the number of participants within a predetermined area, or other factors. The first participant can continue to update the position of objects until each participant is safe from other participants and non-participants or until position updates of an object are no longer needed, e.g., when an object no longer poses a threat to the first participant.

Figure 10:
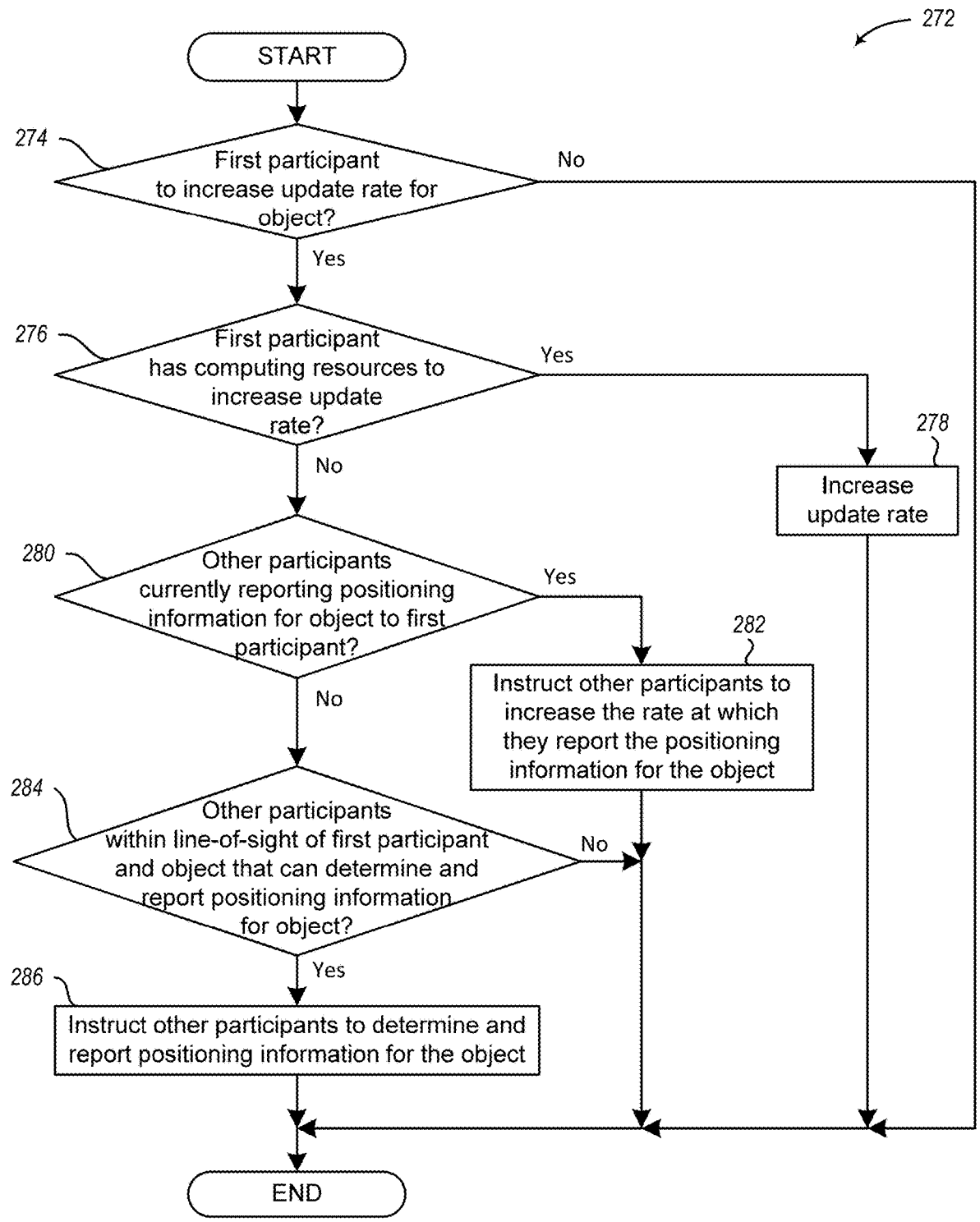
FIG. 10 illustrates a logical flow diagram showing one embodiment of a process for increasing an update rate in accordance with embodiments described herein.

FIG. 10 illustrates a logical flow diagram showing one embodiment of a process for increasing an update rate in accordance with embodiments described herein. Process 272 begins, after a start block, at decision block 274, where a determination is made whether a first participant is to increase an update rate for tracking an object. In various embodiments, this determination may be made at decision block 226 in FIG. 8 or decision block 260 in FIG. 9. If the update rate is to be increase, process 272 flows to decision block 276; otherwise, process 272 terminates or otherwise returns to a calling process.

At decision block 276, a determination is made whether the first participant has the computing resources to increase the update rate. For example, if the participant is running on battery power or the battery power is below a predetermine threshold, then the first participant may not have the computing resources to increase the update rate. In another example, if the first participant is tracking multiple objects and other objects pose a greater threat to the first participant than the particular object associated with the increased update rate, then the first participant may focus its sensor time and processing power on tracking the objects with the greater threat and thus does not have the computing resources to increase the update rate for the particular object. If the first participant has the computing resources to increase the update rate for the object, then process 272 flows to block 278 to increase the update rate (e.g., as described above in conjunction with block 230 in FIG. 8 or block 262 in FIG. 9); otherwise process 272 flows to decision block 280.

At decision block 280, a determination is made whether other participants are currently reporting to the first participant the positioning information for the object. If there are other participants reporting the positioning information to the first participant, then process 272 flows to block 282; otherwise, process 272 flows to decision block 284.

At block 282, the first participant instructs the other participants to increase the rate at which they report the positioning information for the object to the first participant. In some embodiments, the other participants may increase the rate at which they broadcast notification signals to determine the position of the object, such as discussed herein. In other embodiments, the other participants may already be determining the positioning information for the object at a higher rate, but may not be reporting it as often. Thus, the other participants may increase the rate at which they report the positioning information for the object to the first participant. After block 282, process 272 terminates or otherwise returns to a calling process.

If there are no other participants currently reporting the positioning information for the object (or if not enough other participants are reporting), then process 272 flows from decision block 280 to decision block 284. At decision block 284, a determination is made whether there are other participants within line-of-sight of the first participant and the object, such that those other participants can determine and report the positioning information for the object. If other participants can determine and report the positioning information, then process 272 flows to block 286 to instruct the other participants to determine and report the positioning information for the object to the first participant at the increased update rate; otherwise, process 272 terminates or otherwise returns to a calling process.

Figure 11:
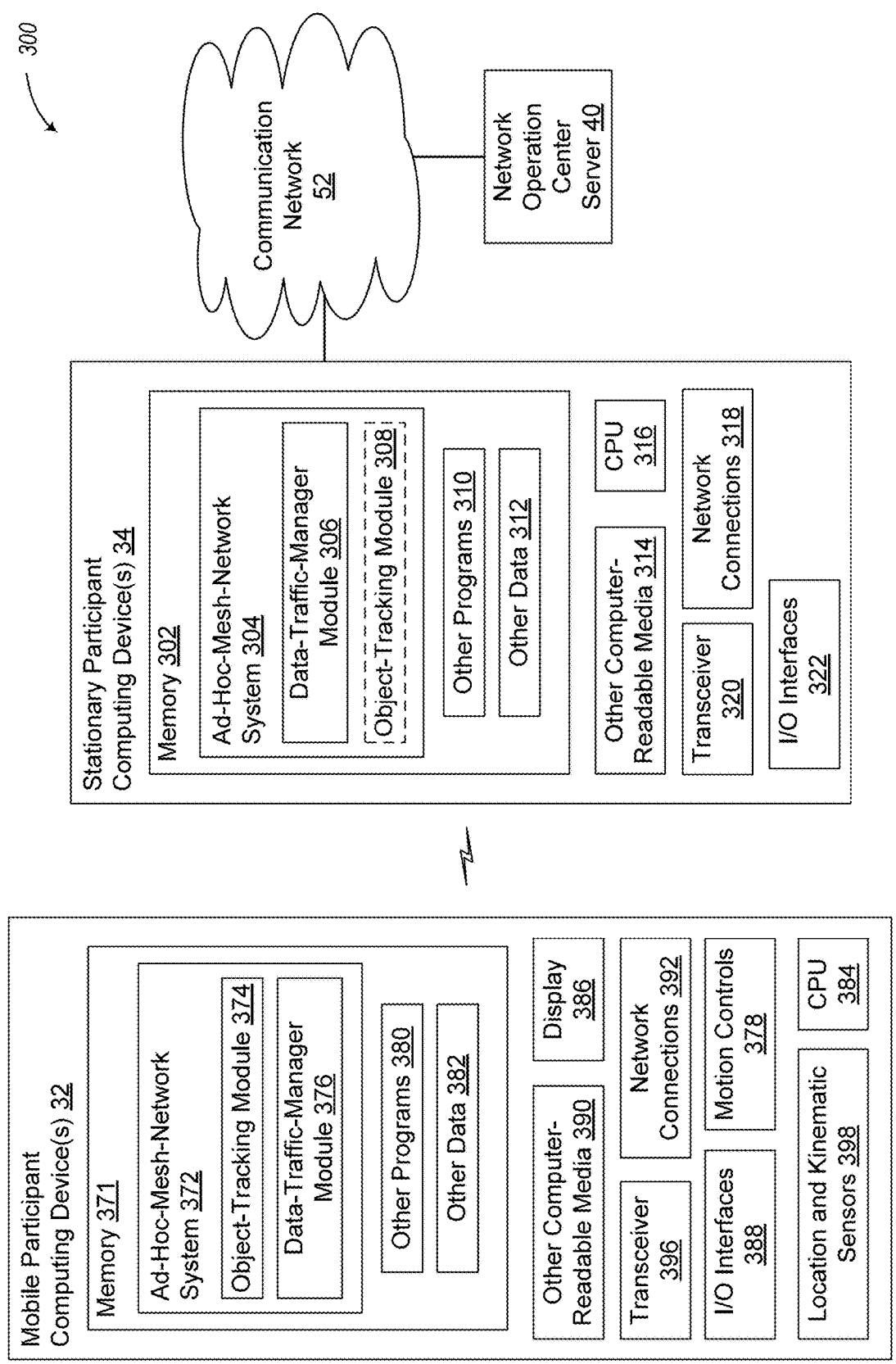
FIG. 11 shows a system diagram that describes one implementation of computing systems for implementing embodiments described herein.

FIG. 11 shows a system diagram that describes one implementation of computing systems for implementing embodiments described herein. System 300 includes mobile participant computing device(s) 32, stationary participant computing device(s) 34, and network operation center server 40.

Mobile participant computing device(s) 32 communicate with one or more other mobile participant computing devices 32 and stationary participant computing devices 34 via line-of-sight communications to track objects and to transmit information or data to other participants. One or more special-purpose computing systems may be used to implement each mobile participant computing device 32. Accordingly, various embodiments described herein may be implemented in software, hardware, firmware, or in some combination thereof. A mobile participant computing device 32 may include memory 371, one or more central processing units (CPUs) 384, display 386, I/O interfaces 388, other computer-readable media 390, network connections 392, transceiver 396, motion sensors 398, and motion controls 378.

Memory 371 may include one or more various types of non-volatile and/or volatile storage technologies. Examples of memory 371 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 371 may be utilized to store information, including computer-readable instructions that are utilized by CPU 384 to perform actions, including embodiments described herein.

Memory 371 may have stored thereon ad-hoc-mesh-network system 372, which includes object-tracking module 374 and data-traffic-manager module 376. The object-tracking module 374 may employ embodiments described herein to track objects, including other participants and non-participant, and to take action to reduce a threat posed by an object. The data-traffic-manager module 376 may employ embodiments described herein to transfer data from one participant to another participant.

Although object-tracking module 374 and data-traffic-manager module 376 are shown as separate modules, embodiments are not so limited. Rather, a single module or a plurality of additional modules may be utilized to perform the functionality of object-tracking module 374 and data-traffic-manager module 376.

The memory 371 may also store other programs 380 and other data 382. The other programs 380 may include user applications, other tracking or geo-positioning programs, etc. The other data 382 may include data or information regarding one or more tracked objects, data or information regarding participants that are within line-of-sight of the mobile participant computing device 32, or other information.

Network connections 392 are configured to communicate with other computing devices, such as other mobile participant computing devices 32 and stationary participant computing devices 34 via transceiver 396 and line-of-sight communications mechanisms and technologies. Transceiver 396 may be a broadcast-type transceiver that sends and receives radio signals independent of direction, or transceiver 396 may be a directional transceiver that sends or receives, or both sends and receives, radio signals to or from a particular direction relative to the positioning of the mobile participant computing device 32.

Location and kinematic sensors 398 include one or more sensors that are used to determine the position of the mobile participant computing device 32 and the kinematic information of how the mobile participant computing device 32 is moving, which is utilized by the object-tracking module 374, the data-traffic-manager module 376, or both to perform their respective functionality. Examples of location and kinematic data sensors 398 include, but are not limited to GPS modules, accelerometers, gyroscopes, or other sensors that can be used to determine the position and kinematic information of the mobile participant computing device 32.

Motion controls 378 are components that can be used to control a position or action of the mobile participant computing device 32 or the associated object hosting the mobile participant computing device 32, which are controlled by the object-tracking module 374 to avoid a potential threat by a tracked object. Examples of motion controls 378 include steering adjustment controls or motors, automatic breaking controls or motors, audio or visual warning systems, or other types of controls that can be used to adjust the position or movement of the mobile participant computing device 32 or to inform a user to adjust the position or movement of the mobile participant computing device 32.

Other I/O interfaces 388 may include a keyboard, audio interfaces, video interfaces, or the like. Other computer-readable media 390 may include other types of stationary or removable computer-readable media, such as removable flash drives, external hard drives, or the like. Display 386 is a display interface that is configured to output images, content, or information to a user. Examples of display 386 include, but are not limited to, LCD screens, LEDs or other lights, or other types of display devices.

Stationary participant computing device(s) 34 communicate with mobile participant computing devices 32 via line-of-sight communications to transmit information or data to other participants. One or more special-purpose computing systems may be used to implement each stationary participant computing device 34. Accordingly, various embodiments described herein may be implemented in software, hardware, firmware, or in some combination thereof. A stationary participant computing device 34 may include memory 302, one or more central processing units (CPUs) 316, I/O interfaces 322, other computer-readable media 314, network connections 318, and transceiver 320.

Memory 302 may include one or more various types of non-volatile and/or volatile storage technologies. Examples of memory 302 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 302 may be utilized to store information, including computer-readable instructions that are utilized by CPU 316 to perform actions, including embodiments described herein.

Memory 302 may have stored thereon ad-hoc-mesh-network system 304, which includes data-traffic-manager module 306 and optionally object-tracking module 308. The data-traffic-manager module 306 may employ embodiments described herein to transfer data from one participant to another participant, similar to data-traffic-manager module 376. In some embodiments, the stationary participant computing device 34 may also include the object-tracking module 374, which may employ embodiments described herein to track objects. As described elsewhere herein, some stationary participant computing devices 34 may be used in conjunction with one or more mobile participant computing devices 32 to improve the accuracy of an object's position being tracked by at least one of the one or more mobile participant computing devices 32. The object-tracking module 208 may employ embodiments described herein to track objects, including other participants and non-participant, similar to object-tracking module 374. Although data-traffic-manager module 306 and object-tracking module 308 are shown as separate modules, embodiments are not so limited. Rather, a single module or a plurality of additional modules may be utilized to perform the functionality of data-traffic-manager module 306 and object-tracking module 308. In various embodiments, data-traffic-manager module 306 or object-tracking module 308, or both, may communicate with network operation center server 40 via communication network 52.

The memory 302 may also store other programs 310 and other data 312. The other data 312 may include data or information regarding one or more tracked objects, data or information regarding participants that are within line-of-sight of the stationary participant computing device 34, or other information.

Network connections 318 are configured to communicate with other computing devices, such as other stationary participant computing devices 34 and mobile participant computing devices 32 via transceiver 320 and wired or line-of-sight communications mechanisms and technologies. Network connections 318 are also configured to communicate with the network operation center server 40 via communication network 52.

Transceiver 320 may be a broadcast-type transceiver that sends and receives radio signals independent of direction, or transceiver 320 may be a directional transceiver that sends or receives, or both sends and receives, radio signals to or from a particular direction relative to the position of the stationary participant computing device 34.

Other I/O interfaces 314 may include a keyboard, audio interfaces, video interfaces, or the like. Other computer-readable media 314 may include other types of stationary or removable computer-readable media, such as removable flash drives, external hard drives, or the like.

Network operation center server 40 includes one or more computing devices that store information about the positioning of mobile participant computing devices 32 and stationary participant computing devices 34. The network operation center server 40 may also store information regarding the positioning and movement of non-participant objects that are reported to it by the mobile participant computing devices 32 or the stationary participant computing devices 34. The network operation center server 40 also includes memory, one or more processors, network interfaces and connections, and other computing components similar to mobile participant computing devices 32 and stationary participant computing devices 34, but those components are not shown here for ease of illustration.

Communication network 52 may include one or more wired or wireless communication networks to transmit data between one stationary participant computing device 34 and another stationary participant computing device 34 or with the network operation center server 40.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computing device of a mobile participant, comprising:
   a memory that stores computer instructions; and
   a processor that executes the computer instructions to perform actions, comprising:
      determining a first position and first kinematic information of the mobile participant computing device;
      determining a second position and second kinematic information of an object in proximity to the mobile participant computing device;
      determining a distance from the object to the mobile participant computing device based on the first position of the mobile participant computing device and the second position of the object;
      determining a velocity of closure from the object to the mobile participant computing device based on the first kinematic information of the mobile participant computing device and the second kinematic information of the object;
      increasing a rate at which to update the second position and the second kinematic information of the object when a relationship between the distance and the velocity of closure exceeds a first threshold;
      decreasing the rate at which to update the second position and the second kinematic information of the object when the relationship between the distance and the velocity of closure is less than a second threshold; and
      updating the second position and the second kinematic information of the object based on the rate.

2. The computing device of claim 1, wherein the processor executes the computer instructions to perform further actions, including:
   determining an accuracy of the second position of the object;
   increasing the rate at which to update the second position of the object when the accuracy is below a third threshold; and
   decreasing the rate at which to update the second position of the object when the accuracy is above a fourth threshold.

3. The computing device of claim 1, wherein the processor executes the computer instructions to perform further actions, including:
   requesting additional positional information of the object from a second mobile participant computing device that is in proximity to the object when an accuracy of the second position of the object is below a third threshold value;

receiving the additional positional information of the object from the second mobile participant computing device; and determining an updated second position of the object based on a combination of the received additional positional information and the second position of the object.

4. The computing device of claim 1, wherein determining the second position and the second kinematic information of the object, includes:

transmitting a notification signal that includes an identity of the mobile participant computing device and the first position and the first kinematic information of the mobile participant computing device;

receiving, from the notification signal bouncing off the object, an echo signal that includes the identity and the first position and the first kinematic information of the mobile participant computing device; and determining the second position of the object relative to the mobile participant computing device based on the echo signal received by the mobile participant computing device.

5. The computing device of claim 1, wherein determining the second position and the second kinematic information of the object, includes:

receiving a notification signal from the object that includes the second position and the second kinematic information of the object.

6. The computing device of claim 1, wherein the processor executes the computer instructions to perform further actions, including:

performing an action based on the updated position and the updated second kinematic information of the object with respect to the first position and the first kinematic information of the mobile participant computing device.

7. A method, comprising:

determining, by a computing device, a first position and first kinematic information of the mobile participant computing device;

determining, by the computing device, a second position and second kinematic information of an object in proximity to the mobile participant computing device;

determining, by the computing device, a distance from the object to the mobile participant computing device based on the first position of the mobile participant computing device and the second position of the object;

determining, by the computing device, a velocity of closure from the object to the mobile participant computing device based on the first kinematic information of the mobile participant computing device and the second kinematic information of the object;

increasing, by the computing device, a rate at which to update the second position and the second kinematic information of the object when a relationship between the distance and the velocity of closure exceeds a first threshold;

decreasing, by the computing device, the rate at which to update the second position and the second kinematic information of the object when the relationship between the distance and the velocity of closure is less than a second threshold; and updating, by the computing device, the second position and the second kinematic information of the object based on the rate.

8. The method of claim 7, further comprising:

determining, by the computing device, an accuracy of the second position of the object;

increasing, by the computing device, the rate at which to update the second position of the object when the accuracy is below a third threshold; and decreasing, by the computing device, the rate at which to update the second position of the object when the accuracy is above a fourth threshold.

9. The method of claim 8, further comprising:

requesting, by the computing device, additional positional information of the object from a second mobile participant computing device that is in proximity to the object when an accuracy of the second position of the object is below a third threshold value;

receiving, by the computing device, the additional positional information of the object from the second mobile participant computing device; and determining, by the computing device, an updated second position of the object based on a combination of the received additional positional information and the second position of the object.

10. The method of claim 8, wherein determining the second position and the second kinematic information of the object, includes:

transmitting, by the computing device, a notification signal that includes an identity of the mobile participant computing device and the first position and the first kinematic information of the mobile participant computing device;

receiving, by the computing device, from the notification signal bouncing off the object, an echo signal that includes the identity and the first position and the first kinematic information of the mobile participant computing device; and determining, by the computing device, the second position of the object relative to the mobile participant computing device based on the echo signal received by the mobile participant computing device.

11. The method of claim 8, wherein determining the second position and the second kinematic information of the object, includes:

receiving, by the computing device, a notification signal from the object that includes the second position and the second kinematic information of the object.

12. The method of claim 8, further comprising:

performing, by the computing device, an action based on the updated position and the updated second kinematic information of the object with respect to the first position and the first kinematic information of the mobile participant computing device.

13. The method of claim 8, further comprising:

modifying, by the computing device, the rate at which to update the second position and the second kinematic information of the object based on a combination of at least one of the following:
a probability of crossing trajectories between the object and the mobile participant,
a maneuverability of the object,
a maneuverability of the mobile participant, and
one or more environmental conditions associated with the object and the mobile participant.

14. A non-transitory computer-readable medium having stored computing instructions that, when executed by at least one processor, cause the at least one processor to:

determine a first position and first kinematic information of the mobile participant computing device;

determine a second position and second kinematic information of an object in proximity to the mobile participant computing device;

determine a distance from the object to the mobile participant computing device based on the first position of the mobile participant computing device and the second position of the object;

determine a velocity of closure from the object to the mobile participant computing device based on the first kinematic information of the mobile participant computing device and the second kinematic information of the object;

increasing a rate at which to update the second position and the second kinematic information of the object when a relationship between the distance and the velocity of closure exceeds a first threshold;

decrease the rate at which to update the second position and the second kinematic information of the object when the relationship between the distance and the velocity of closure is less than a second threshold; and update the second position and the second kinematic information of the object based on the rate.

15. The non-transitory computer-readable medium of claim 14, wherein execution of the computing instructions further cause the at least one processor to:

determine an accuracy of the second position of the object;

increase the rate at which to update the second position of the object when the accuracy is below a third threshold; and decrease the rate at which to update the second position of the object when the accuracy is above a fourth threshold.

16. The non-transitory computer-readable medium of claim 14, wherein execution of the computing instructions further cause the at least one processor to:

request additional positional information of the object from a second mobile participant computing device that is in proximity to the object when an accuracy of the second position of the object is below a third threshold value;

receive the additional positional information of the object from the second mobile participant computing device; and determine an updated second position of the object based on a combination of the received additional positional information and the second position of the object.

17. The non-transitory computer-readable medium of claim 14, wherein execution of the computing instructions to cause the at least one processor to determine the second position and the second kinematic information of the object further cause the at least one processor to:

transmit a notification signal that includes an identity of the mobile participant computing device and the first position and the first kinematic information of the mobile participant computing device;

receive from the notification signal bouncing off the object, an echo signal that includes the identity and the first position and the first kinematic information of the mobile participant computing device; and determine the second position of the object relative to the mobile participant computing device based on the echo signal received by the mobile participant computing device.

18. The non-transitory computer-readable medium of claim 14, wherein execution of the computing instructions to cause the at least one processor to determine the second position and the second kinematic information of the object further causes the at least one processor to:

receive a notification signal from the object that includes the second position and the second kinematic information of the object.

19. The non-transitory computer-readable medium of claim 14, wherein execution of the computing instructions further cause the at least one processor to:

perform an action based on the updated position and the updated second kinematic information of the object with respect to the first position and the first kinematic information of the mobile participant computing device.

20. The non-transitory computer-readable medium of claim 14, wherein execution of the computing instructions further cause the at least one processor to:

modify the rate at which to update the second position and the second kinematic information of the object based on a combination of at least one of the following:

a probability of crossing trajectories between the object and the mobile participant, a maneuverability of the object, a maneuverability of the mobile participant, and one or more environmental conditions associated with the object and the mobile participant.

* * * * *